US011352727B2

(12) United States Patent
Kim et al.

(10) Patent No.: US 11,352,727 B2
(45) Date of Patent: Jun. 7, 2022

(54) DRIVE UNIT OF A LAUNDRY MACHINE AND LAUNDRY MACHINE HAVING THE SAME, AND A CONTROLLING METHOD OF THE LAUNDRY MACHINE

(71) Applicant: LG Electronics Inc., Seoul (KR)

(72) Inventors: Hyeokdeok Kim, Seoul (KR); Byunghwan Ahn, Seoul (KR); Kuyoung Son, Seoul (KR); Yonggyung Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 16/422,458

(22) Filed: May 24, 2019

(65) Prior Publication Data

US 2019/0276972 A1    Sep. 12, 2019

Related U.S. Application Data

(60) Division of application No. 15/963,702, filed on Apr. 26, 2018, now Pat. No. 11,118,300, which is a
(Continued)

(30) Foreign Application Priority Data

Jan. 27, 2016  (KR) .................. 10-2016-0010017
Dec. 20, 2016  (KR) .................. 10-2016-0175181
Dec. 28, 2016  (KR) .................. 10-2016-0181567

(51) Int. Cl.
*D06F 33/48*   (2020.01)
*D06F 29/00*   (2006.01)
(Continued)

(52) U.S. Cl.
CPC .............. *D06F 31/00* (2013.01); *D06F 33/36* (2020.02); *D06F 33/48* (2020.02); *D06F 37/304* (2013.01);
(Continued)

(58) Field of Classification Search
CPC .......... D06F 18/00; D06F 25/00; D06F 29/00; D06F 29/005; D06F 29/02; D06F 31/00;
(Continued)

(56) References Cited

U.S. PATENT DOCUMENTS 6,396,190 B1    5/2002  Ahn
2003/0056554 A1  3/2003  Ahn
(Continued)

FOREIGN PATENT DOCUMENTS

EP           1450468        8/2004
KR    10-2011-0025571       3/2011
(Continued)

OTHER PUBLICATIONS

United States Office Action in U.S. Appl. No. 15/963,702, dated Mar. 19, 2020, 24 pages.
(Continued)

*Primary Examiner* — David G Cormier
(74) *Attorney, Agent, or Firm* — Fish & Richardson P.C.

(57) ABSTRACT

The present disclosure relates to a twin laundry machine, more particularly, to a twin laundry machine configured to control mutual motor operations of one or more laundry machines provided therein not to be overlapped with each other, in case the one or more laundry machines are put into operation to perform washing. The present disclosure also relates to a twin laundry machine of which a motor for driving a drum has an improved heat radiation function, more particularly, to a twin laundry machine which includes a sub-washing machine with a smaller size than a normal washing machine and frequent exposure to high temperature usage environments.

19 Claims, 12 Drawing Sheets

Related U.S. Application Data continuation of application No. 15/628,483, filed on Jun. 20, 2017, now Pat. No. 10,053,812, which is a continuation of application No. 15/416,106, filed on Jan. 26, 2017, now Pat. No. 10,501,883.

(51) Int. Cl.
*D06F 31/00* (2006.01)
*D06F 33/36* (2020.01)
*D06F 37/30* (2020.01)
*D06F 39/00* (2020.01)

(52) U.S. Cl.
CPC .............. *D06F 29/00* (2013.01); *D06F 39/00* (2013.01); *Y02B 40/00* (2013.01)

(58) Field of Classification Search
CPC .......... D06F 33/00; D06F 33/32; D06F 33/36; D06F 33/38; D06F 33/40; D06F 33/42; D06F 33/44; D06F 33/48; D06F 34/04; D06F 34/08; D06F 34/10; D06F 35/00–008; D06F 37/00; D06F 37/304; D06F 39/00; D06F 58/00–04; D06F 58/203; D06F 58/30; D06F 2103/24; D06F 2103/46; D06F 2105/46; D06F 2105/48; D06F 2202/00; D06F 2202/12; D06F 2204/00
See application file for complete search history.

(56) References Cited

U.S. PATENT DOCUMENTS

| | | |
|---|---|---|
| 2004/0154345 A1 | 8/2004 | Park |
| 2006/0119214 A1 | 6/2006 | Park |
| 2008/0224552 A1 | 9/2008 | Ahn |
| 2009/0145174 A1 | 6/2009 | Kim et al. |
| 2011/0265524 A1 | 11/2011 | Kim |
| 2012/0299406 A1 | 11/2012 | Hong et al. |
| 2014/0000097 A1 | 1/2014 | Dokonal et al. |
| 2015/0211164 A1 | 7/2015 | Kim |
| 2016/0215432 A1* | 7/2016 | Kim ................... D06F 33/00 |
| 2018/0127909 A1 | 5/2018 | Cho et al. |

FOREIGN PATENT DOCUMENTS

| | | | |
|---|---|---|---|
| KR | 10-2011-0122306 | 11/2011 | |
| KR | 10-1217219 | 5/2012 | |
| KR | 10-1345327 | 12/2013 | |
| WO | WO-0212609 A1 * | 2/2002 | ............. D06F 37/30 |

OTHER PUBLICATIONS

International Search Report in International Application No. PCT/KR2017/000901, dated May 23, 2017, 10 pages.
Extended European Search Report in European Application No. 17153371.4, dated Apr. 26, 2017, 7 pages (with English translation).
Extended European Search Report in European Application No. 18151022.3, dated May 4, 2018, 6 pages.

* cited by examiner

DRIVE UNIT OF A LAUNDRY MACHINE AND LAUNDRY MACHINE HAVING THE SAME, AND A CONTROLLING METHOD OF THE LAUNDRY MACHINE

CROSS-REFERENCE TO RELATED APPLICATIONS

This application is a divisional of U.S. application Ser. No. 15/963,702, filed on Apr. 26, 2018, which is a continuation of U.S. application Ser. No. 15/628,483, filed on Jun. 20, 2017, now U.S. Pat. No. 10,053,812, which is a continuation of U.S. application Ser. No. 15/416,106, filed on Jan. 26, 2017, which claims the benefit of earlier filing date and right of priority to Korean Applications Nos. 10-2016-0010017, 10-2016-0175181, and 10-2016-0181567, filed on Jan. 27, 2016, Dec. 20, 2016, and Dec. 28, 2016, respectively, in Korea, the entire contents of which are hereby incorporated by reference herein in their entirety.

BACKGROUND OF THE DISCLOSURE

Field of the Disclosure

Embodiments of the present disclosure relate to a twin laundry machine, more particularly, to a twin laundry machine configured to control mutual motor operations of one or more laundry machines provided therein not to be overlapped with each other, in case the one or more laundry machines are put into operation to perform washing.

Embodiments of the present disclosure also relate to a twin laundry machine of which a motor for driving a drum has an improved heat radiation function, more particularly, to a twin laundry machine which includes a sub-washing machine with a smaller size than a normal washing machine and frequent exposure to high temperature usage environments.

Embodiments of the present disclosure also relate to a drive unit of a laundry machine which is capable of improving the function of heat-radiation performed by a drive for driving a drum, and a laundry machine having the same.

Discussion of the Related Art

A conventional laundry machine is used in treating laundry or washing objects through diverse operations combined with washing, spinning and/or drying cycles.

Such a conventional laundry machine includes a washing machine configured to wash laundry such as clothes and beddings by using the emulsification activity of detergent, the water current activity generated by the rotation of a tub or pulsator and the mechanical power applied by the pulsator; a dryer configured to dry laundry by applying hot air or cold air to the laundry; and a refresher configured to remove wrinkles from clothes by applying steam. Also, there are diverse types of laundry machines configured to provide diverse functions such as a washing machine having a washing function and a drying function.

The conventional laundry machine has to be provided with the minimum amount of wash water needed to perform washing. If a large volume of a tub is provided, unnecessarily much wash water has to be provided even in washing a small amount of laundry.

To solve such a disadvantage of water waste, a mini-washing machine or a washing machine for infants has been provided.

However, it causes a spatial disadvantage to install both one conventional laundry machine and one mini-washing machine together so as to use both of them. It also causes a design disadvantage to use the conventional laundry machine and the mini-washing machine which have different designs and versions.

Recently, a twin laundry machine including two washing machines is provided to address the problem. The twin laundry machine is provided as one body with two units (or two washing machines). Specifically, a first washing unit and a second washing unit are installed as if having one body so as to make better use of a space and improve use convenience and provide an effectively beautiful design.

The first washing unit provided in the twin laundry machine may be a main-washing machine with a relatively large size and the second washing unit may be a sub-washing machine or a mini-washing machine with a relatively small size. The volume of the first washing machine for washing or drying is larger than that of the second washing unit. Accordingly, a user seems to be able to use one of the two washing machines selectively according to needs and give specific functions to each of the washing machines. The user can be provided with the specialized functions that cannot be provided when having one laundry machine.

Vibration might be caused when the two washing units perform washing at the same time or two twin laundry machines are put into operation. In this instance, the vibration results in errors of the twin laundry machine and power consumption might drastically rise. The washing units are not completely and physically separated from each other and the vibration generated in one of the washing units could directly affect the other washing unit.

As one usage example of the twin laundry machine, the second washing unit is provided in main consideration of sanitation and it is used in treating infant clothes or underwear. Accordingly, the second washing unit is used a lot in sterilizing laundry in boiling water which is heated to a preset high temperature. A sterilize-washing course takes a relatively long time to simply heat wash water to a preset high temperature and keep the high temperature after that. In other words, the sterilize-washing course is implemented to perform washing in a state where wash water is kept at a high temperature for a relatively long time.

To perform the sterilize-washing course, a heater is driven to heat wash water to a preset high temperature. Different from the first washing unit with the normal size, the second washing unit has a relatively small size and volume with a tiny internal space. Accordingly, the heat generated while the wash water is heated to the preset high temperature seems to be transferred to the other components which are provided nearby.

Especially, the high-temperature heat happens to affect the drive unit configured to drive the second washing unit. For example, the high-temperature heat might be transferred to a motor for driving a drum provided in the second washing unit.

The motor generates heat by its own driving. If exposed to a preset high temperature or more, the motor fails to drive normally and happens to damage or stop its drive unexpectedly. Especially, it is quite important to keep a stator which generates much heat out of overheat.

FIG. 1 illustrates a schematic diagram of a rotor provided in a motor of the conventional laundry and FIG. 2 is a sectional diagram illustrating an air inlet part shown in FIG. 1 along a circumferential direction.

A stator of the motor may be coupled to an outer rear wall of a tub, and a drum may be rotatably mounted in a tub.

As shown in FIG. 1, the rotor 10 includes a rotor frame 20 and a plurality of magnets 60. The rotor frame 20 includes a side wall 30 to which the plurality of the magnets 60 are mounted; and a bottom wall 40.

A central portion of the bottom wall 40 is connected to a shaft of the drum. When the rotor is rotated by the electromagnetic force generated between the stator and the rotor, the rotational force of the rotor is transferred to the drum shaft and the drum.

On a FIG. 1 basis, the side wall 30 is vertically extended upward from the bottom wall 40. In other words, the side wall 30 is extended from a radial-direction end of the circular bottom wall.

The shape of the side wall 30 and the bottom wall 40 allows the rotor frame 20 to have a container-shaped appearance so as to define an internal space. The stator is disposed in the internal space of the rotor frame 20.

It is well known that the stator is coupled to the tub through the central portion of the tub and a coil is provided distant from a center of the stator in a radial direction. Corresponding to the stator, an air inlet part 41 is provided. In other words, the air inlet part 41 is provided in the bottom wall 40 and a plurality of air inlet parts 41 may be provided along a circumferential direction. A plurality of openings 43 may be defined.

A hub 50 is formed in the central portion of the bottom wall 40 and a connector may be coupled to the hub 50. The connector may be connected to the drum shaft.

An embossing portion 44 may be formed in the bottom wall 40. In this instance, a plurality of embossing portions 44 may be provided along a circumferential direction. The embossing portions 44 and the air inlet parts 41 may be arranged alternatively.

The embossing portions 44 may be provided to reinforce the stiffness of the rotor frame 20, especially, the bottom wall 40. The bottom wall 40 is formed as a thin plate so that distortion or floppiness might be generated in the bottom wall 40 during the rotation of the rotor 10. To minimize such distortion or floppiness, the embossing portions 44 may be provided.

The air inlet parts 41 may be provided to suck external air, in other words, cold air into the rotor. On a FIG. 2 basis, the air inlet parts 41 may be provided to suck air upward from a lower portion of the rotor.

When the rotor 10 is rotated, air flux may be generated in the internal space of the rotor (in other words, the space where the stator is provided) by a blade 42 and the pressure inside the rotor is relatively lower than the pressure outside the rotor. In addition, the air heated by the stator tends to go up.

Accordingly, when the rotor 10 is rotated, external cold air is sucked into the stator via the air inlet parts 41 and hot air inside the stator goes up and outside via a gap between the stator and the rotor or the space between the stator and the tub.

The rotor having the structure of the air inlet parts 41 has no big problem chilling the stator.

Different from the conventional motor, the motor for driving the second washing unit could be exposed not only to the heat generated therein, especially, the stator but also the heat transferred from the hot tub arranged nearby. Accordingly, such the heat has to be radiated effectively enough to keep the driving of the drum.

However, the rotor having the structure of the conventional air inlet parts 41 only chills the heat generated in the stator but fails to provide a satisfactory cooling function if the heat transferred from the hot tub is added.

That is because the holes for sucking external air into the rotor are aligned or parallel with the rotational direction of the rotor. In other words, external air cannot be sucked into the rotor smoothly.

Moreover, the blade is extended near the holes toward the stator and disposed in the rotor so that it directly blows internal air of the rotor, not external air. As the blade blows relatively-high-temperature air toward the stator, not external air, the cooling efficiency may become lower.

It may be considered to enhance the cooling efficiency that the blade 42 is formed higher. However, such the blade stands high toward the stator and it is limited to increase the height of the blade. If the blade becomes higher, the rotor also has to become higher. Accordingly, it is also limited because of the small installation space and the relatively small size.

It is necessary to invent and provide a motor which is capable of effectively and efficiently radiating not only the heat generated in the stator but also the heat transferred from a surrounding high-temperature environment and a drive unit including such a motor which is provided in a laundry machine.

It is also necessary to invent and provide a second washing unit which has an improved reliability by effective radiating of the heat generated in a drive unit of the second washing unit and a twin laundry machine having such a second washing unit.

Moreover, it is necessary to invent and provide a twin laundry machine which has the improved reliability and durability of first and second washing units by minimizing of the influence of the heat generated in a drive unit of the second washing unit on the first washing unit.

SUMMARY OF THE DISCLOSURE

An object of the present disclosure is to overcome the disadvantages of the conventional laundry machine and the conventional twin laundry machine noted above.

Embodiments of the present disclosure provide a twin laundry machine including a plurality of washing units configured to perform washing independently, the twin laundry machine configured to set operations of motors provided in the washing units, respectively, not to be overlapped with each other, when the washing units perform washing at the same time, and a control method of the same.

Embodiments of the present disclosure also provide a laundry machine and a twin laundry machine which are capable of chilling a drive unit provided in each of the machines for driving a drum effectively and more efficiently.

Embodiments of the present disclosure also provide a twin laundry machine which is capable of chilling a drive unit provided in a small-sized second washing unit thereof more effectively and efficiently.

Embodiments of the present disclosure also provide a laundry machine and a twin laundry machine which are capable of chilling a drive unit provided in each of the machines, especially, a stator of a motor effectively.

Embodiments of the present disclosure also provide a laundry machine and a twin laundry machine which can be realized by changing a conventional structure of a rotor, even without installing or mounting an auxiliary component for chilling.

Embodiments of the present disclosure also provide a rotor having a structural stiffness and capable of enhancing chilling efficiency by integral forming of an air inlet structure and an embossing structure as one structure, and a laundry machine or twin laundry machine including the same.

Embodiments of the present disclosure also provide a drive unit having a noticeably improved heat-radiation function and a laundry machine including the same.

Embodiments of the present disclosure also provide a control method of a twin laundry machine comprising a first washing unit comprising a first tub and a first motor for driving the first tub; a second washing unit comprising a second tub and a second motor for driving the second tub, the second washing unit separately operable from the first washing unit; a first controller for controlling the first washing unit; and a second controller for controlling the second washing unit, wherein the first controller categorizes operations of the first motor for performing washing, rinsing and spinning cycles according to operation settings by motion unit, and sets the time period in which the first motor performs one motion one time as one operation-on period and controls an operation-on period of the first motor and an operation-on period of the second motor not to be overlapped with each other.

Embodiments of the present disclosure also provide a control method of a twin laundry machine comprising a first washing unit comprising a first tub and a first motor for driving the first tub; a second washing unit comprising a second tub and a second motor for driving the second tub, the control method comprising: a step for controlling the first motor to perform a first motion of the motions implemented to give the laundry loaded in the first tub certain washing effects for a first operation-on period; a step for controlling the second motor to standby for a first operation-off, corresponding to the first operation-on period; a step for controlling the second motor to perform a second motion of the motions for a second operation-on period, when the first operation-on period ends; a step for controlling the first motor to standby for a second operation-off period, corresponding to the second operation-on period; and a step for controlling the first motor and the second motor to perform the motions combined with the plurality of the operations for operation-on periods which are set not to be overlapped with each other, respectively.

In the twin laundry machine according to the embodiments, the motor for driving the drum, specifically, the stator according to embodiments which will be described later may be applied. Especially, the stator for driving the drum provided in the second washing unit which has a high frequency of high-temperature usage environments and a relatively small size may be a stator according to embodiments.

To settle the objects of the present disclosure, the drive unit of the washing unit may include a stator and a rotor. When the rotor is rotated, a new structure of the rotor for sucking a much amount of relatively-low-temperature external air may be provided.

To increase the inlet amount of external air, the drive unit of the second washing unit includes a stator and a rotor. An external air supply channel configured to collect external air flow may be formed in an outer bottom surface of the rotor, when the rotor formed in an arc direction is rotated.

An opening may be formed near the external air supply channel and vertically formed in the bottom surface of the rotor, to communicate with an internal space of the rotor.

The drive unit of the second washing unit may include a stator and a rotor in accordance with another embodiment of the present disclosure. An opening may be vertically formed.

Embodiments of the present disclosure also provide a twin laundry machine comprising: a first washing unit comprising a first tub, a first drum and a first drive unit for driving the first drum; a second washing unit comprising a second tub, a second drum and a second drive unit for driving the second drum, wherein the second drum has a diameter which is larger than the height and a rotation axis which intersects a rotation axis of the first drum, the second drive unit comprises a stator fixed to an outer surface of a bottom wall of the second tub; a drum shaft connected to the second drum, penetrating the second tub; and a rotor coupled to the drum shaft and rotatably surrounding the stator, and the rotor comprises a rotor frame; a magnet; and a connector for connecting the rotor frame and the drum shaft with each other, and the rotor frame comprises a side wall in which the magnet is mounted; a bottom wall horizontally extended from a lower end of the side wall; and an air inlet part formed in the bottom wall, and the air inlet part comprises a first wall projected toward the stator and formed in a circumferential direction to face a side wall of the rotor; a second wall projected toward the stator from an inner portion of the rotor side wall in a radial direction with respect to the first wall side wall of the rotor and alternate with the first wall in a circumferential direction; a third wall projected in a circumferential direction from an inner portion of the rotor side wall in a radial direction with respect to the second wall to face the third wall and the second wall; and a plurality of side walls for connecting the first wall and the second wall with each other, and the side wall comprises a first side wall for connecting one end of the first wall and one end of the neighboring second wall with each other; and a second side wall for connecting the other end of the first wall and one end of the neighboring second wall, and an opening in which air is sucked into the rotor frame is formed in the first side wall.

The second washing unit may be separable from the first washing unit.

The second tub and the second drum may be vertically arranged in the second washing unit.

The second washing unit may be arranged on a top of the first washing machine.

The rotor may comprise a hub projected from a center of the bottom wall toward the drum shaft and comprising a horizontal surface opposite to the stator and a vertical surface opposite to the drum shaft.

The connector may be made of a plastic material and coupled to the drum shaft to be coupled to the rotor frame, in close contact with the horizontal surface and the vertical surface of the hub.

The hub may comprise another vertical surface opposite to the second wall of the air inlet part and projected toward the stator.

The horizontal surface of the hub may be a bottom wall of the rotor near the third wall of the air inlet part.

The second side wall of the air inlet part may form a front side with respect to a rotational direction of the rotor, and the first side wall in which the opening is formed to suck air may form a rear side with respect to the rotational direction of the rotor.

An opening formed in a first side wall of the air inlet part may be vertically formed with respect to a bottom surface of the rotor.

A second side wall of the air inlet part may be longer than a first side wall in which the opening is formed.

One side of the second wall of the air inlet part may be closer to the side wall of the rotor than the other side in a radial direction.

A first side wall of the air inlet part may be connected with one side of the second wall formed close to the side wall of the rotor in the radial direction.

A predetermined front portion of the second wall of the air inlet part with respect to the rotation direction of the rotor may be closer to the side wall of the rotor in the radial direction than the other rear portion.

The second wall of the air inlet part may further comprise an opening in which air is able to be sucked.

Embodiments of the present disclosure also provide a twin laundry machine comprising: a first washing unit comprising a first tub, a first drum and a first drive unit for driving the first drum; a second washing unit comprising a second tub, a second drum and a second drive unit for driving the second drum, wherein the second drum has a diameter which is larger than the height and a rotation axis which intersects a rotation axis of the first drum, the second drive unit comprises a stator fixed to an outer surface of a bottom wall of the second tub; a drum shaft connected to the second drum, penetrating the second tub; and a rotor coupled to the drum shaft and rotatably surrounding the stator, and the rotor comprises a rotor frame; a magnet; and a connector for connecting the rotor frame and the drum shaft with each other, and the rotor frame comprises a side wall in which the magnet is mounted; a bottom wall horizontally extended from a lower end of the side wall; and an air inlet part formed in the bottom wall, and the air inlet part comprises an external air inlet channel projected from the bottom wall toward the stator and comprising a radial-direction inner wall, a radial-direction outer wall, an upper wall connecting the inner wall and a top of the outer wall with each other, and a front wall connecting the inner wall and a front end of the outer wall with each other; and an opening formed by the inner wall, a rear end of the outer wall and the upper wall and through which external air is sucked into the rotor frame.

The opening may be vertically formed with respect to a bottom wall of the rotor.

The plurality of the air inlet parts may be spaced a preset distance apart from each other along a circumferential direction.

The circumferential-direction length of the inner wall may be larger than the circumferential-direction length of the outer wall.

The plurality of the air inlet parts may be consecutively formed along a circumferential direction.

A circumferential-direction gap between the air inlet parts may be equal to or smaller than the circumferential-direction length of the air inlet part.

A circumferential-direction gap between the air inlet parts may be larger than the circumferential-direction length of the air inlet part.

The front wall and the upper wall may form an acute angle.

The front wall and the upper wall may form one inclined wall.

The front wall and the upper wall may be connected with each other by a curved wall.

The opening may be formed by the inner wall, a rear end of the outer wall and a rear end of the upper wall of the neighboring air inlet part.

The air inlet part may further comprise an external air supply channel formed in an inner portion of the external air inlet channel with respect to a radial direction and projected toward the stator from the bottom wall and formed along the circumferential direction.

The external air supply channel and the external air inlet channel may be in communication with each other.

The external air supply channel may be consecutively formed along a circumferential direction.

The external air supply channel may comprise an upper wall; an inner wall consecutively formed in an inner radial-direction portion in a circumferential direction; and an outer wall intermittently formed in an outer radial-direction portion in the circumferential direction.

The outer wall of the external air supply channel and the outer wall of the external air inlet channel may be alternate with each other along a circumferential direction.

An inner wall of the external air supply channel may be in communication with a space between an outer wall of the external air supply channel in a radial direction.

The upper wall of the external air supply channel and an upper wall of the external air inlet channel may be connected with each other.

The height of an upper wall of the external air supply channel may be equal to that of the upper wall of the external air inlet channel.

In the embodiments, the first washing unit and the second washing unit provided in the twin laundry machine are integrally formed with each other by one body or cabinet.

In the embodiments, the first washing unit and the second washing unit of the twin laundry machine have its independent cabinets, respectively, and the cabinets may be disposed or coupled to each other. Accordingly, the first washing unit and the second washing unit may be provided as independent washing machines so that it can be said that each of them is a separate independent washing machine.

Embodiments of the present disclosure also provide a drive unit of a laundry machine comprising a tub; a drum mounted in the tub and configured to wash laundry; the drive unit connected to a drum shaft penetrating the tub and configured to drive the drum, the drive unit comprising a stator fixed to an outer surface of a bottom wall provided in the tub; and a rotor coupled to the drum shaft and supported to rotate, with surrounding the stator, wherein the rotor comprises a rotor frame; a magnet; and a connector for connecting the rotor frame and the drum shaft with each other, and the rotor frame comprises a side wall for seating the magnet therein; and a bottom wall horizontally extended from a lower end of the side wall, and an external air supply channel is projected from the stator toward the stator in a circumferential direction to be recessed from an outer surface of the bottom wall continuously, and the external air supply channel comprises an internal wall formed in a radial direction and an external wall formed in the radial direction; an external wall formed outer to the internal wall in a radial direction; a narrow region having a relatively narrow width between the internal wall and the external wall; and a wide region having a relatively wide width between the internal wall and the external wall, and an external air inlet hole is formed an internal or external wall portion of the wide region which faces one end of the narrow region.

The external air supply channel is projected toward the stator and continuously extended along a circumferential direction.

The internal wall of the external air supply channel may be continuously formed in a circumferential direction and the external wall is bending in the circumferential direction.

Accordingly, the external wall may be formed in a saw-tooth shape or pin-wheel shape.

In contrast, the external wall of the external air supply channel may be continuously formed in a circumferential direction and the internal wall may be bent with respect to the circumferential direction. In this instance, the internal wall may be formed in a saw-tooth shape or pin-wheel shape.

The external wall comprises a circumferential-direction wall facing the internal wall in the narrow region and bending in a radial direction to intersect the internal wall in the wide region; and a radial-direction wall bending in a radial direction in the wide region to intersect the internal wall. The radial-direction wall may be also formed even in the wide region. In this instance, the radius of the radial-direction wall in the narrow is larger than the radius of the radial-direction wall in the wide region. Because of that, the narrow region is distinguished from the wide region.

The external air inlet hole may be formed in one of the radial-direction walls provided in the external wall.

The external air inlet hole may be located in a rear one of the radial-direction walls of the external wall with respect to the rotational direction of the rotor.

The circumferential-direction wall may be inclined along the circumferential direction in the narrow region or the wide region. Such inclination may be linear or curved. The circumferential-direction wall is formed in a linear or curved shape.

A front portion of the radial-direction wall may be outer to a rear portion in the narrow region in a radial direction with respect to the rotational direction of the rotor.

The external air inlet hole may be additionally formed in the circumferential-direction wall in the narrow region. In other words, the external air inlet hole may be formed in at least predetermined area of the circumferential-direction wall.

The radial-direction wall may be bent perpendicular to the internal wall in the wide region.

The external wall of the external air supply channel may be continuously formed in a circumferential direction and the internal wall is bent in the circumferential direction.

The internal wall may comprise a radial-direction wall facing the external wall in the narrow region; a radial-direction wall bent inward in a radial direction to intersect the external wall in the wide region.

The external air inlet hole may be formed in one of the radial-direction walls provided in the internal wall.

The external air inlet hole may be located in a rear one of the radial-direction walls of the internal wall with respect to the rotational direction of the rotor.

The circumferential-direction wall may be inclined along the circumferential direction in the narrow region or the wide region.

A front portion of the radial-direction wall may be outer to a rear portion in the narrow region in a radial direction with respect to the rotational direction of the rotor. Such inclination may be formed linear or curved.

The external air inlet hole may be additionally formed in the circumferential-direction wall in the narrow region.

The radial-direction wall may be bent perpendicular to the external wall in the wide region.

The internal wall and the external wall may be bent in the circumferential direction.

The internal and external walls may comprise circumferential-direction walls facing each other in the narrow region; and Radial-direction walls bent in an opposite direction in the wide region.

The external air inlet hole may be formed in one of the radial-direction walls in the wide region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

According to the embodiments of the present disclosure, the twin laundry machine including a plurality of washing units configured to perform washing independently may be configured to set operations of motors provided in the washing units, respectively, not to be overlapped with each other, when the washing units perform washing at the same time, and a control method of the same.

Furthermore, the laundry machine and the twin laundry machine are capable of chilling a drive unit for driving a drum effectively and more efficiently.

Still further, the laundry machine and the twin laundry machine is capable of chilling a drive unit provided in a small-sized second washing unit thereof more effectively and efficiently.

Still further, the laundry machine and the twin laundry machine are capable of chilling a drive-unit, especially, a stator of a motor effectively.

Still further, the laundry machine and the twin laundry machine can be realized by changing a conventional structure of a rotor, even without installing or mounting an auxiliary component for chilling.

Still further, the drive unit has a structural stiffness and is capable of enhancing chilling efficiency by integral forming of an air inlet structure and an embossing structure as one structure, and each of the laundry machine and the twin laundry machine including the drive unit.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Preferred embodiments of the present invention will be described below in more detail with reference to the accompanying drawings. Use of such terminology for structures and control methods herein is merely intended to facilitate description of the specification, and the terminology itself is not intended to give any special meaning or function. In the present disclosure, that which is well-known to one of ordinary skill in the relevant art has generally been omitted for the sake of brevity.

Figure 3:
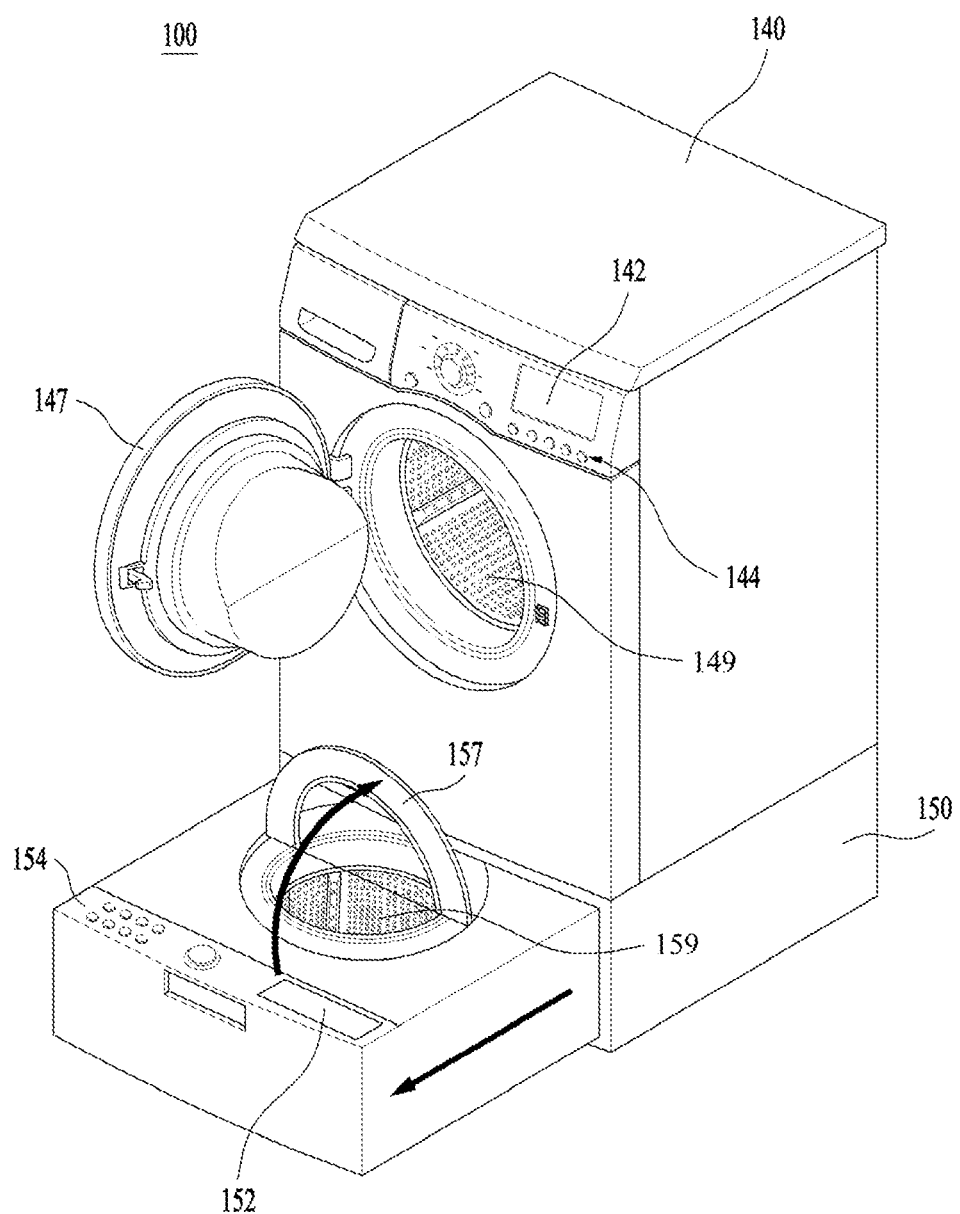
FIG. 3 is a perspective diagram illustrating a twin laundry machine in accordance with one embodiment of the present disclosure.

FIG. 3 is a perspective diagram illustrating a twin laundry machine as one embodiment of the present disclosure.

Referring to FIG. 3, the twin laundry machine 100 includes a first washing unit 140 and a second washing unit 150.

The first washing unit 140 and the second washing unit 150 are arranged as top and bottom. The first washing unit 140 is arranged on the second washing unit 150 and the first and second washing units 140 and 150 are able to be connected with or disconnected from each other. In other words, the first and second washing units 140 and 150 have cabinets, respectively. The cabinets may be connectable and disconnected. Accordingly, it looks as if two washing units are provided in one cabinet.

As one alternative example, the first washing unit 140 and the second washing unit 150 may be provided in one cabinet. In this instance, the two washing units cannot be separated from each other.

The first washing unit 140 may be a front load twin laundry machine and the second washing unit 150 is a top load twin laundry machine. At this time, the first washing unit 140 may be a front load dryer or a front load washer having a drying function and a washing function.

The front load twin laundry machine may mean a washing machine of which a drum is rotary with respect to a substantially horizontal shaft, because it allows laundry to be loaded into the drum from a front side to a rear side.

The top load twin laundry machine means a washing machine of which a drum for treating laundry is rotary with respect to a substantially vertical shaft, because it allows laundry to be loaded into the drum from a top side to a bottom.

The second washing unit 150 may be a drawer type structure which is able to slide forward and backward so as to be open and closed. When the second washing unit 150 is pulled forward, a top end of the second washing unit 150 is shown. A second input unit 154, a second output unit 152 and a second door 157 are arranged in the top end of the second washing unit 150.

The first washing unit 140 may include a first input unit 144, a first output unit 142 and a first door 147. The second washing unit 150 may include a second input unit 154, a second output unit 152 and a second door 157.

Each of the first and second washing units 140 and 150 includes its own input unit 154 or 156 and output unit 142 or 152, so that commands may be input to the first and second washing units 140 and 150 independently and they can perform operations corresponding to the input commands, respectively.

Each of the first and second washing units 140 and 150 may include a tub 148 and 158 for holding water; a drum 149 and 159 rotatably provided in the tub; a motor rotating the drum; a water supply mechanism for supplying water to the tub or the drum; and a drainage mechanism for draining the water from the tub, so as to perform washing independently.

It is shown that the volume of the drum provided in the washing unit 140 is larger than that of the drum provided in the second washing unit 150. Alternatively, it is possible that the volume of the drum mounted in the tub of the first washing unit 140 is smaller than that of the drum provided in the second washing unit 150. In other words, it is preferred that the volume of the drum provided in one of the washing units is smaller than that of the drum provided in the other one.

FIG. 3 shows that the second washing unit which is the top load type having the drum with the small volume is arranged under the first washing unit which is the front load type having the drum with the large volume. Alternatively, the second washing unit is arranged on the first washing unit as the top. In the latter, it is not necessary that the second washing unit should be the drawer type. Different from the former, the top where laundry is loaded is open. Accordingly, the second washing unit may be provided to prevent the drum from moving back and forth, like the conventional top load type. Even in this instance, the second door 157 may be provided.

The first washing unit 140 and the second washing unit 150 may be a twin laundry machine having a washing function and a drying function.

Figure 4A:
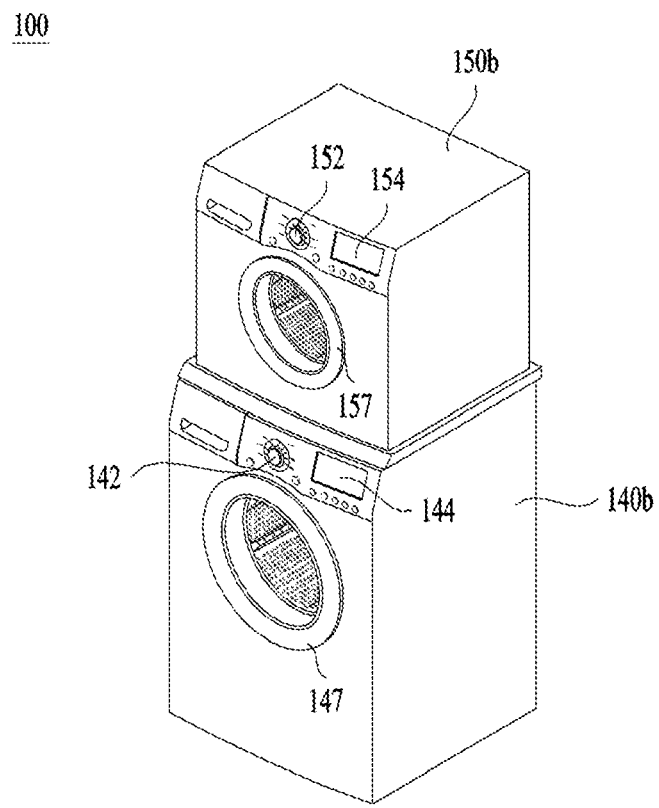
FIGS. 4A and 4B are perspective diagrams illustrating a twin laundry machine in accordance with another embodiment of the present disclosure.
Figure 4B:
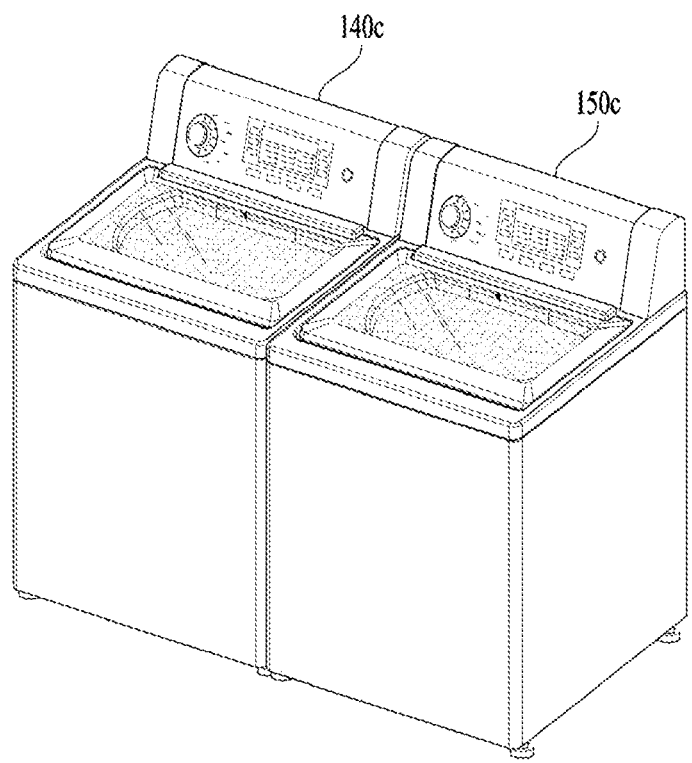

FIGS. 4A and 4B are perspective diagrams illustrating a twin laundry machine in accordance with another embodiment of the present disclosure.

As shown in FIG. 4A, the twin laundry machine may be configured of a first washing unit 140b and a second washing unit 150b which are all front load type laundry machines.

The twin laundry machine has the second washing unit 150b arranged on the first washing unit 140b. In other words, the second washing unit having a drum with a small volume may be arranged on a top of the first washing unit having a drum with a large volume.

The twin laundry machine shown in FIG. 4B may include a first washing unit 140c and a second washing unit 150c which are all of top load laundry machines.

The first washing unit 140c and the second washing unit 150c may be arranged side by side (or right and left), not as top and bottom.

Hereinafter, the illustrated embodiment shown in FIG. 3 provides the twin laundry machine having the first washing unit 140 and the second washing unit 150 which are arranged as top and bottom. However, the arrangement and type of the first and second washing units is not limited to what is shown and variable in diverse ways.

Figure 5A:
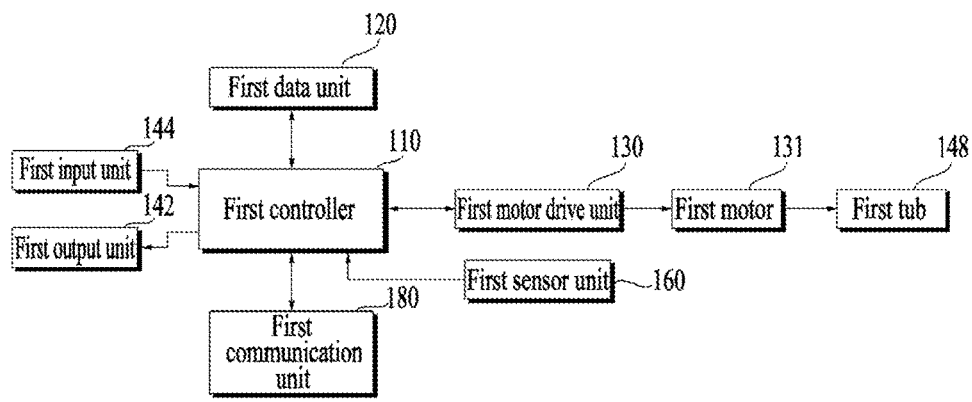
FIGS. 5A and 5B are block diagrams illustrating a first washing unit and a second washing unit which are provided in the twin laundry machine in accordance with the embodiment of FIG. 3.
Figure 5B:
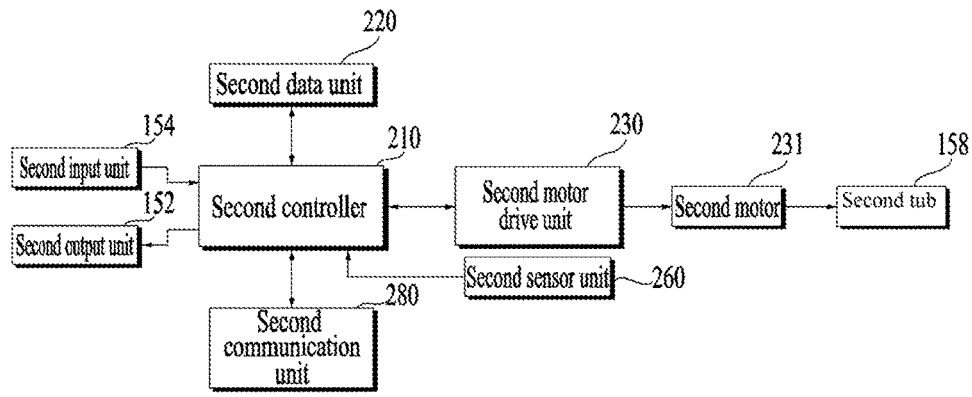

FIGS. 5A and 5B are block diagrams illustrating the structure of the first washing unit and the structure of the second washing unit of the twin laundry machine.

As shown in FIG. 5A, the first washing unit 140 includes a first input unit 144; a first output unit 142; a first tub 148; a first motor 131; a first motor drive unit 130; a first sensor unit 160; a first communication unit 180; a first data unit 120; and a first controller 110 controlling an overall operation of the first washing unit 140.

As shown in FIG. 5B, the second washing unit 150 includes a second input unit 154; a second output unit 152; a second tub 158; a second motor 231; a second motor drive unit 230; a second sensor unit 260; a second communication unit 280; a second data unit 220; and a second controller 210 for controlling an overall operation of the second washing unit 150. In this instance, the structure of the second washing unit 150 is equal to that of the first washing unit 140 which will be described hereinafter and detailed description about the structure of the second washing unit 150 is omitted.

The first input unit 144 includes input means such as one or more buttons, a switch and a touchpad. A user inputs operational settings such as the power, washing courses, water levels and temperatures.

The first input unit 144 may include a simultaneous option key showing that the first and second washing units 140 and 150 are operated simultaneously. Data about the simultaneous operation is input to the first controller 110, once the user manipulates the simultaneous operation key. Unless such an auxiliary simultaneous operation key is provided in the first input unit 144, the user may manipulate two of the buttons simultaneously or at least two of the buttons in order to input the data about the simultaneous operation to the first controller 110.

The first output unit 142 displays information about the operational setting input to the first input unit 144. The first output unit 142 includes a display for outputting an operational state of the twin laundry machine and a speaker and a buzzer for outputting preset sound effects or alarms.

In the first data unit 120 may be stored control data for controlling the operation of the twin laundry machine, input operational setting data, data about the washing courses, data for determining whether an error occurs in the twin laundry machine. In addition, the data sensed or measured during the operation of the twin laundry machine and the data transceived by the first communication unit 180 may be stored in the first data unit 120.

The first communication unit 180 is connected to the second washing unit 150 via wire or wirelessly and transceives data. In response to a control command of the first controller 110, the first communication unit 180 transmits data about washing course setting or data according to the operation of the motor to the second communication unit and receives data from the second communication unit.

The first sensor unit 160 includes a plurality of sensors and measures voltages or currents of the twin laundry machine and data about the temperature, the water level and a state of the door to transmit the measured data to the first controller 110.

For example, the first sensor unit 160 includes the sensors which are installed in different positions. The first sensor unit 160 senses a water level of wash water and transmits the sensed water level to the first controller 110. Also, it measures the temperature of wash water to sense the temperature inside a control circuit and the temperature of the heater in case a heater for heating or drying wash water is provided.

The first motor drive unit 130 supplies the electric power so as to rotatably drive the first motor 131 connected to the first tub according to the control command of the first controller 110. The first motor drive unit 130 controls a rotational direction, a rotational angle and rotational velocity of the first motor 131 according to the preset setting. Also, the first motor drive unit 130 controls the first motor 131 to be driven differently according to the preset washing course, the ongoing washing, rinsing and spinning.

In this instance, the first motor drive unit 130 controls the rotational direction, rotational angle and rotational velocity of the first motor to be differentiated so as to form specific water currents in the first tub 148.

The first motor drive unit 130 controls the first motor 131 to form specific water currents by combining one or more operations of the first motor 131, for example, clockwise rotation, pausing, counter-clockwise rotating, rotating at a high or low velocity for a preset time period. Accordingly, the motions of the first motor give specific washing effects to the laundry loaded in the first tub 148.

The operations for forming specific water currents by combining the motor operations to give one of washing effects including entangling, soaking, detergent dissolving and laundry rubbing may be set as one motion. The first motor drive unit 130 classifies the operations for washing, rinsing and spinning by motion unit so as to control the motor 131.

In this instance, the first motor drive unit 130 controls one motion to be performed for a preset operation period. Also, it controls the operations of the motor which consists of one motion to be set differently for each motion. The operation period as the time period taken to perform one motion one time is set differently for each motion.

The first controller 110 applies a control command to a first valve controller 170 and the first motor drive unit 130 according to the operation setting transmitted from the first input unit 144 so as to perform water supply or drainage of the first tub 148. Then, the first tub 148 is rotated according to the operation of the first motor 131 and washing is performed. The first controller 110 controls a series of washing processes such as washing, rinsing and spinning. That is, the first controller 110 stores the input operational setting in the first data unit 120 and outputs the operational setting or operational state on the first output unit 142. Also, the first controller 110 controls the first communication unit 180 to transmit the operational data to the second washing unit 150.

The first controller 110 applies a control command to the first motor drive unit 130 by classifying the operations of the first motor for performing washing, rinsing and spinning cycles according to the wash setting by motion unit and a control command and applies a control command to the first motor drive unit 130 on a basis of the operation period which is the time period taken for the first motor to perform one motion one time.

At this time, the first controller 110 controls the operation period of the second motor 231 provided in the second washing unit not to be overlapped with the operation period of the first motor by transceiving data with the second washing unit via the first communication unit 180.

When driving or pausing the motor even in case the first and second washing units perform washing simultaneously, the first controller 110 and the second controller 210 controls the operational periods not to be overlapped with each other by checking an operation-on period and an operation-off period of the motors based on the data transceived with each other and alternatively operating the first and second motors, not operating the motors simultaneously.

In other words, the first controller 110 and the second controller 210 transceives data with each other via the communication unit consistently and controls the second motor 231 to pause the operation and standby, when the first motor 131 performs one motion, and controls the first motor to standby and the second motor 231 to perform a preset motion, once the motion of the first motor is complete.

In this instance, the first controller 110 and the second controller 210 sets an operation-off period of one motor in response to the size of the operation-on period of the other motor, so as to control an operation-on period and an operation-off period for each motion of the first and second motors 131 and 231.

For example, when the first motor is operated alone, the first motor performs a first motion for a first operation-on period and then standbys for a second operation-off period and then performs a second motion for a third operation period. When the first and second motors are operated simultaneously, the first motor performs the first motion for the first operation-on period and standbys for the second operation-off period. At this time, the first motor starts to perform the second motion once the second operation-on period of the second motor finishes, not starting to perform it right away.

Accordingly, the overall washing time is increased as much as the size of the operation-off period increases. The first controller 110 and the second controller 210 reflects the increased washing time enabled by controlling the motor according to the transceived washing setting in the initial stage and then calculates the washing time. The first and second controller 110 and 210 may change the washing time during the washing process and display the changed washing time.

Figure 6A:
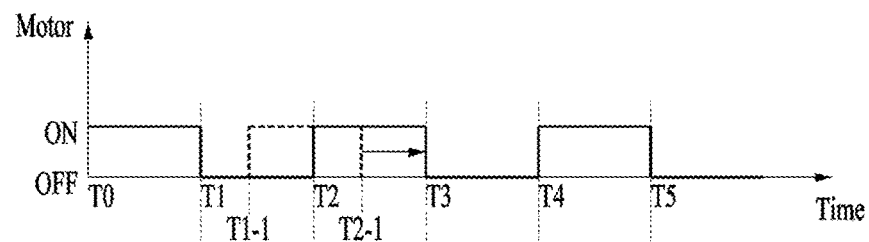
FIGS. 6A and 6B are diagrams illustrating the operations of motors provided in first and second washing units of the twin laundry machine in accordance with the embodiment of FIG. 3, respectively.
Figure 6B:
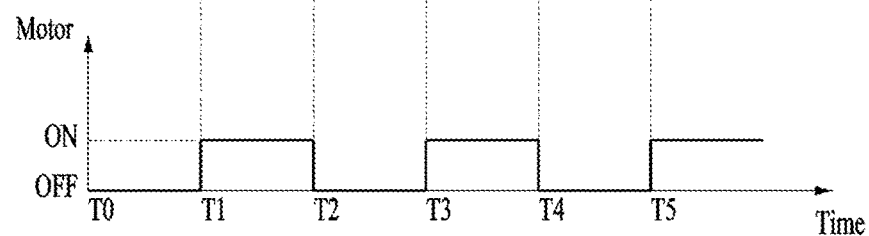

FIGS. 6A and 6B are diagrams illustrating the operations of the motors provided in the first and second washing units of the twin laundry machine in accordance with the illustrated embodiment. FIG. 6A is a diagram illustrating the operation of the first motor 131 and FIG. 6B is a diagram illustrating the operation of the second motor 231.

As shown in FIGS. 6A and 6B, the first motor drive unit 130 controls the first motor 131 according to the control command of the first controller 110. The second motor drive unit 230 controls the second motor 131 according to the control command of the second controller 210, so that such the operations of the first and second tubs 148 and 158 may give the laundry loaded therein preset washing effects.

The first communication unit 180 and the second communication unit 280 transceives data with each other according to the control commands of the first controller 110 and the second controller 210, respectively.

The first motor drive unit 130 controls the first motor 131 according to the control command of the first controller 110. Accordingly, the first motor 131 performs the first motion for the first operation-on period from the zero time (T0) to a first time (T1) and standbys (or pauses or becomes off) from the first time (T1).

Meanwhile, the second motor drive unit 230 controls the second motor 231 according to the control command of the second controller 210. At this time, the second controller 210 determines whether the first motor 131 starts to operate at the zero time (T0) based on the data transmitted from the first washing unit and sets an operation-off period in which the second motor standbys. The second motor drive unit 230 controls the second motor 231 to pause and standby from the zero time (T0) to the first time (T1).

As the operation-on period of the first motor 131 finishes at the first time (T1), the second motor drive unit 230 controls the second motor 231 to be operated for the second operation-on period from the first time (T1) to a second time (T2) according to the control command of the second controller 210.

In case the first motor 131 is operated alone, the operation-off period of the first motion performed for the first operation-on period is from the first time (T1) to a first 1-1 time (T1-1) and then the first motor 131 starts to operate the next motion. At this time, the 1-1 time (T1-1) is the operation-on period of the second motor 231 and the controller 110 sets the operation-off period of the first motor 131 is set to be changed from the period from the first time (T1) to the 1-1 time (T1-1) into the period from the first time (T1) to the second time (T2).

Accordingly, the first motor drive unit 130 controls the first motor 131 to standby in a state of pausing or operation-off from the first time (T1) to the second time (T2) and to starts to operate at the second time (T2).

The first controller 110 increases the operation-off period of the first motor as long as from the 1-1 time (T1-1) to the second time (T2) and also increases the washing time as much as the operation-on period of the first motor is delayed.

The operation-on period of the first motor 131 is set from the second time (T2) to a third time (T3) and the first motor 131 performs a preset motion according to the control of the first motor drive unit 130.

At this time, the second controller 210 sets the operation-off time of the second motor 231 from the second time (T2) to the third time (T3) and the second motor drive unit 230 pauses and standbys the second motor 231 according to the setting.

Accordingly, the second motor 231 standbys until the third time (T3) and starts the operation from the third time (T3) to a fourth time (T4). At this time, the first motor 131 standbys and starts the operation from the fourth time (T4) to a fifth time (T5) while the second motor 231 standbys.

The first controller 110 and the second controller 210 sets the operation-on period and the operation-off period to operate the first motor and the second motor reversely and not to overlap the operations with each other. When the first controller 110 and the second controller 210 transceives data with each other via the communication unit, when one operation-on period starts and finishes, only to repeat the operation-on period and the operation-off period.

In this instance, for the operation-on periods of the first and second motors, the same motion may be continuously performed or different motions may be performed. When different motions are performed, the size of the periods may be set different.

Figure 7:
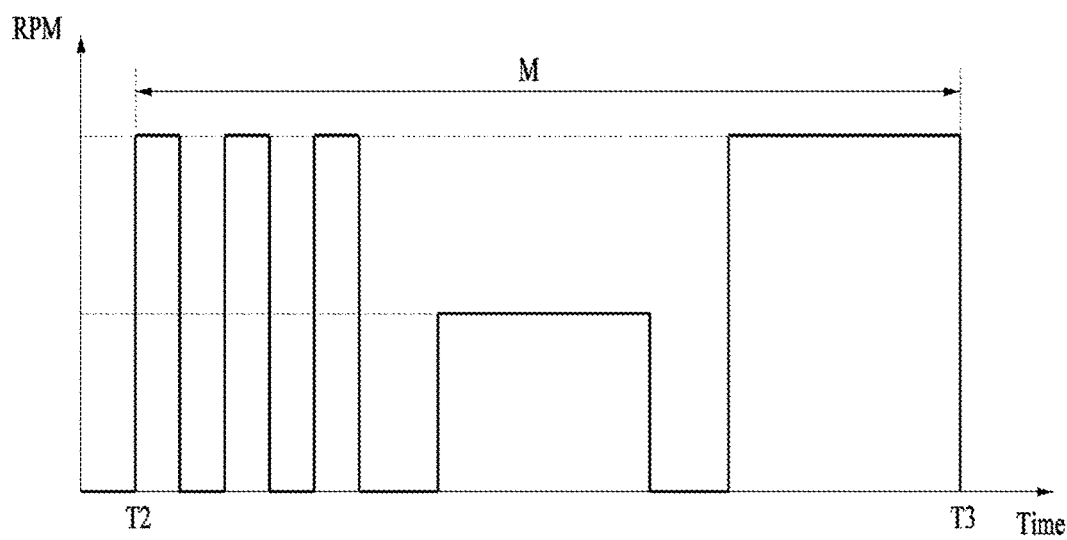
FIG. 7 is a diagram illustrating motions of the motors provided in the twin laundry machine in accordance with the embodiment of FIG. 3.

FIG. 7 is a diagram illustrating the motions of the motors provided in the twin laundry machine.

For the operation-on periods described with reference to FIGS. 6A and 6B, the first motor 131 and the second motor 231 perform one or more preset motions. One motion is configured of several operations combined with one or more of clockwise rotation, pausing, counter-clockwise rotation, high-velocity rotation and low-velocity rotation so as to form specific water currents or give laundry washing effects.

For example, one motion gives laundry one of the entangling, soaking, detergent dissolving and rubbing washing effects.

As shown in FIG. 7, the first motor 131 performs the motion configured of several operations from the second time (T2) to the third time (T3).

For example, the first motor 131 repeats the operation three times in which it rotates and pauses at a first rotation number for a first time period controlled by the first motor drive unit 130, another operation in which it rotates at a second rotation number lower than the first rotation number for a second time period and the pauses and the other operation in which it rotates at the first rotation number for a third time period.

During the one operation-on period, the motor may perform several operations or one operation continuously.

The operations mentioned above are examples of the operations according to the illustrated embodiment and not limited to what is shown in the drawings. Each of the motions may include several different operations.

Figure 8:
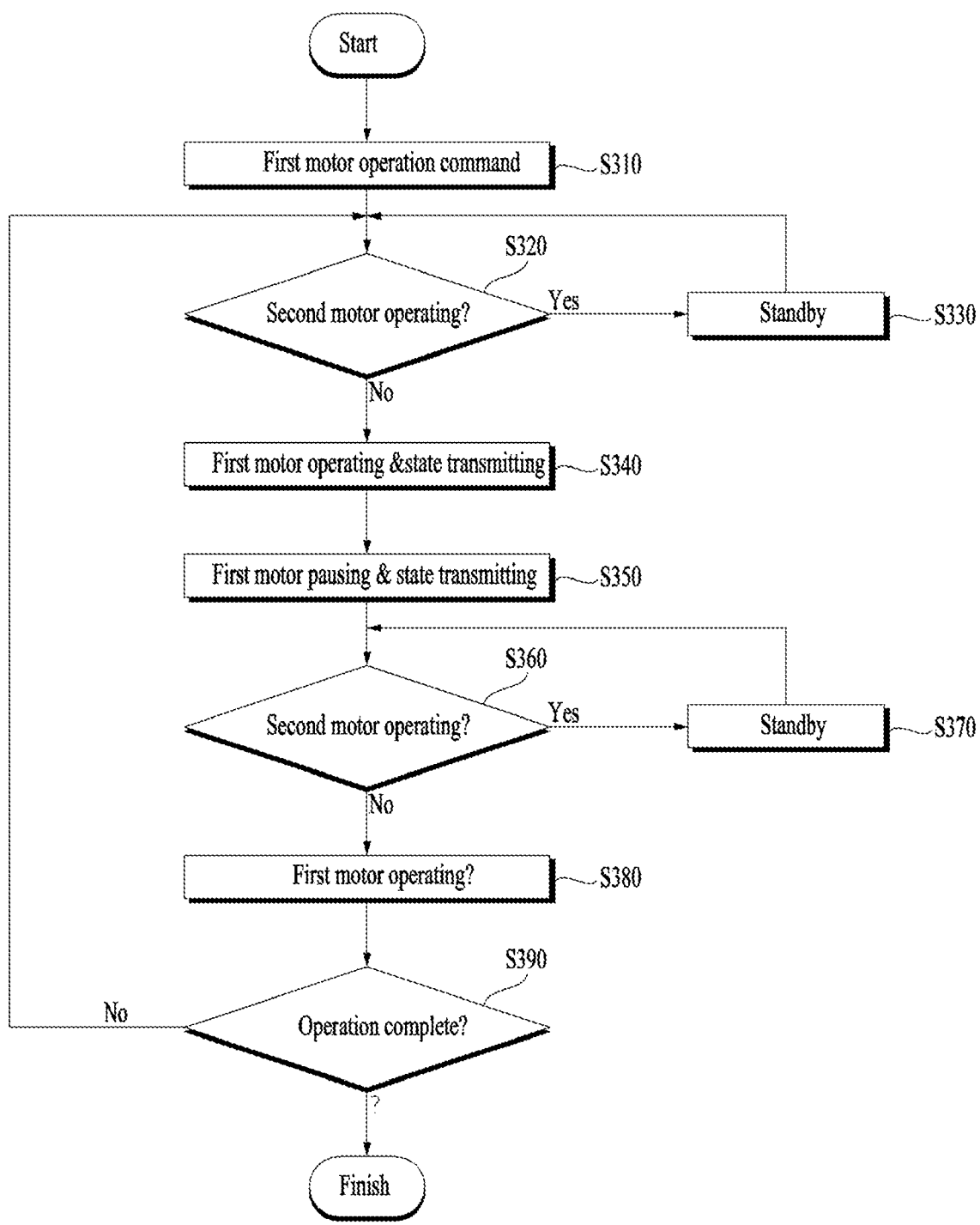
FIG. 8 is a flow chart illustrating a control method of the first and second washing units provided in the twin laundry machine in accordance with the embodiment of FIG. 3.

FIG. 8 is a flow chart illustrating a control method of the first and second washing units provided in the twin laundry machine in accordance with the embodiment of FIG. 3.

As shown in FIG. 8, when the first washing unit 140 and the second washing unit 150 are operated simultaneously, the first controller 110 applies a control command for motor driving to the first motor drive unit 130 along the washing process of the first washing unit 140 configured of washing, rinsing and spinning cycles. At this time, the first controller 110 transceives data about mutual motor driving with the second controller 210 of the second washing unit 150 via the first and second communication units 180 and 280, to set the operation-on periods of the motors not to be reversed, not overlapped with each other. The first controller 110 and the second controller 210 may set the operation-off period for each of the first and second motors, respectively, corresponding to the operation-on periods of the other motor.

The first controller 110 receives an operation command of the first washing unit according to washing settings and controls the first washing unit based on the operation command (S310).

The first controller 110 determines whether the second motor is being operated before driving the first motor 131 (S320).

The first controller 110 controls the first motor 131 to standby in response to data about the operation of the second motor transmitted via the first communication unit 180, in case the second motor performs the operation for a preset operation-on period (S330).

Meanwhile, the first controller applies a control command to the first motor drive unit 130 for the first motor 131 to perform operations according to a preset motion and transmits data about the operation-on period and operational state of the first motor 131 to the second washing unit, when the second motor 231 pauses the operation in its operation-off period (S340).

The first motor drive unit 130 applies an operation power to the first motor 131 according to the control command and drives the first motor to perform the motion combined with one or more of the clockwise rotation, pausing, counter-clockwise rotation, high-velocity rotation and low-velocity rotation for the first operation-on period.

At this time, the second controller 210 receives the data about the operation-on period of the first motor via the second communication unit 280 and sets the operation-off period of the second motor to standby the second motor in the state of pausing. The operation-off period of the second motor is corresponding to the operation-on period of the first motor.

After the first motor 131 completes all of the operations configured as preset one motion for the first operation-on period, the first controller 110 transmits data about the operation pause state and the operation-off period of the first motor 131 to the second washing unit via the first communication unit 180 (S350).

The first controller 110 controls the first motor drive unit 130 to pause the first motor for the second operation-off period set corresponding to the operation-on period of the second motor.

Once the second operation-off period ends, the first controller 110 transmits data to the second washing unit 150 and determines whether the second motor is operated based on the response of the data transmission (S360). The first controller 110 controls the first motor to standby unless the operation-on period of the second motor 231 finishes (S370).

Unless the second motor 231 is operated, in other words, when the operation-on period of the second motor 231 ends or the second motor 231 is in the operation-off period, the first controller 110 applies a control command to the first motor drive unit 130 and transmits data about the operation-on period of the first motor to the second washing unit.

The first motor drive unit 130 controls the first motor to perform operations of a preset motion for the third operation-on period (S380).

Those processes are repeatedly performed until the preset washing setting is complete (S390).

Figure 9:
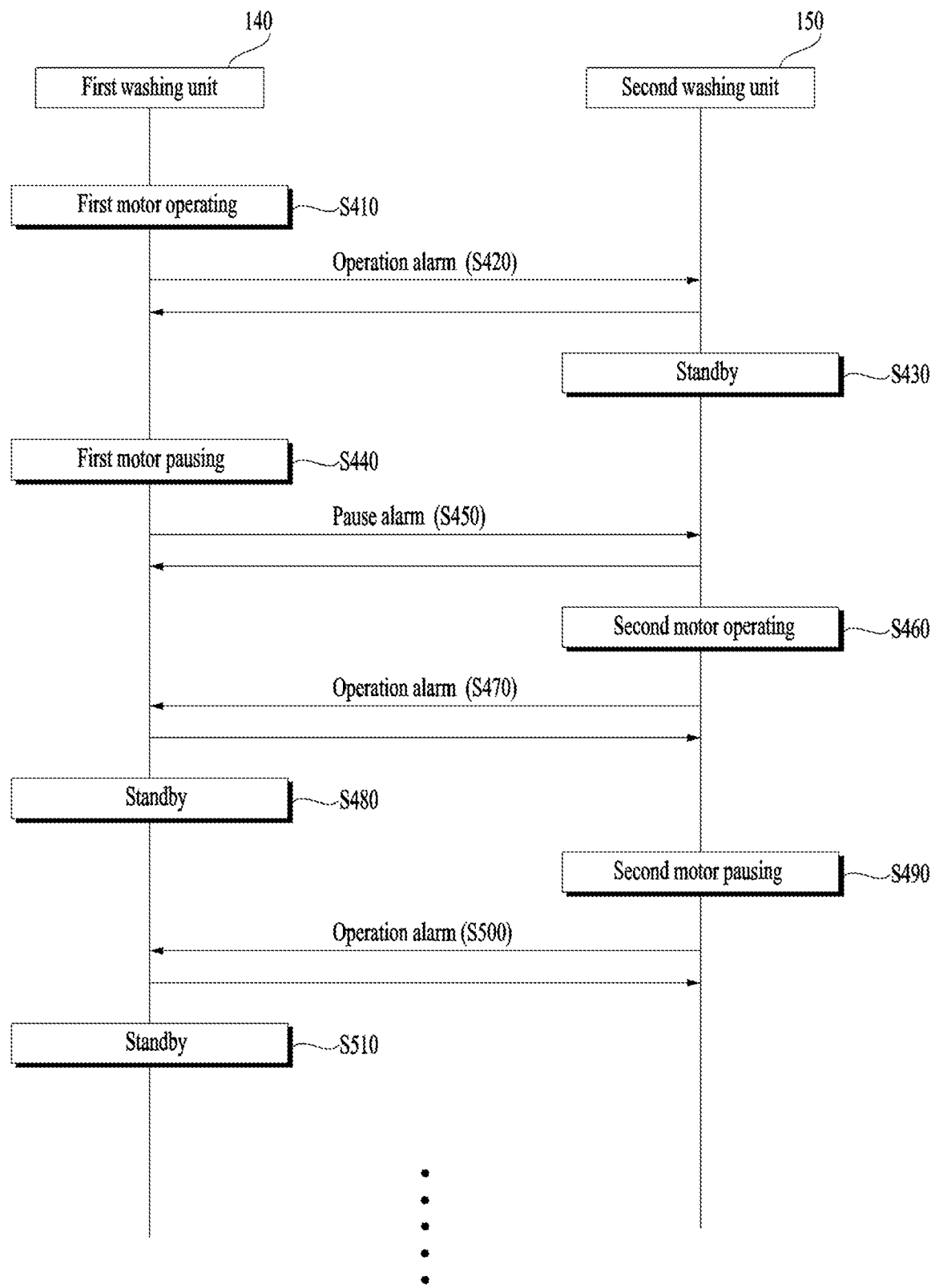
FIG. 9 is a flow chart illustrating the control method of the twin laundry machine shown in FIG. 8.

FIG. 9 is a flow chart illustrating the control method of the twin laundry machine shown in FIG. 8.

As shown in FIG. 9, the first washing unit 140 and the second washing unit 150 transceive data with each other via the first and second communication units 180 and 280 and determine the operational states of the motors.

When the first motor 131 performs the operations configured as one motion for the first operation-on period (S410), the first controller 110 transmits an operation alarm according to the operation-on period of the first motor to the second washing unit 150 (S420) and the second washing unit 150 transmits a response signal for identifying the alarm receiving.

The second washing unit 150 determines the first operation-on period of the first motor based on the operation alarm and sets the first operation-off period of the second motor in response to the first operation-on period of the first motor to standby the first second motor (S430).

Once the first motor 131 completes the operations of the motion, the first motor drive unit 130 pauses the first motor. At this time, the first controller 110 transmits a pausing alarm in response to the operation-on period finishing of the first motor to the second washing unit (s450). The second washing unit 150 transmits a response signal for identifying the alarm receiving.

The second washing unit 150 sets the second operation-on period of the second motor 231 as the first operation-on period of the first motor 131 ends and the second motor performs the operations of the preset motion for the second operation-on period (S460).

At this time, the second controller 210 of the second washing unit 150 transmits an operation alarm for the second operation-on period of the second motor to the first washing unit 140 (S470). The first washing unit 140 transmits a response signal for identifying the alarm receiving.

The first controller 110 sets the second operation-off period of the first motor, corresponding to the second operation-on of the second motor 231 and controls the first motor to standby (S480).

Once the second motor pauses after completing the operations (S490), the second controller 210 transmits a pausing alarm of the second motor to the first washing unit 140 (S500). The first washing machine transmits a response signal for identifying the alarm receiving.

The first controller 110 sets the third operation-on period of the first motor and operates the first motor for the third operation-on period.

The first and second washing units 140 and 150 categorize all of the operations including washing, rinsing and spinning cycles performed by the motor by motion unit and set the operation-on periods and the operation-off periods of the first and second motors via mutual communication, so that they may control the first and second motors not to be operated simultaneously.

Even if the washing units are operated simultaneously, the operations of the first motor and the operations of the second motor are set in reverse and the operation-on periods of the first motor are not overlapped with the operation-on periods of the second motor. Accordingly, the increase of vibration and drastically high power consumption may be prevented and energy use efficiency may be improved.

The embodiments of the twin laundry machine including the first and second washing units and the control method of the same are described which provides more confidence in the product's reliability when the first and second washing units are operated simultaneously.

As mentioned above, the twin laundry machine seems to mean one laundry machine and one laundry machine including two sub-washing machines. Accordingly, the user is able to use each of the sub-washing machines of the twin laundry machine independently and feels like using one machine.

Therefore, the user can think that the product has some problems not problems of components, if one of the tub-washing machines fails to be operated smoothly and normally. For example, if an error occurs in the second washing unit, the user thinks that there is an overall problem with the twin laundry machine. Such the twin laundry machine is not provided with the first and second washing units separately but provided by one supplier, so that it may be quite important to provide the user with the confidence in the product's reliability.

If they are separated independently, the first washing unit and the second washing unit are not high-value products. However, if they are provided as one twin laundry machine, the twin laundry machine may be one of the high-value premium products.

The embodiments described above may be to drive the overall twin laundry machine smoothly and efficiently and embodiments which will be described later are to drive the second washing unit having a small drum volume smoothly and efficiently. In other words, according to the embodiments which will be described later, the second washing unit may be driven smoothly and the twin laundry machine's reliability and durability may be enhanced.

As mentioned above, the drum 159 of the second washing unit is oriented to rotate with respect to the vertical shaft and laundry may be loaded into the drum from the top to the bottom. Compared with the size of the first washing unit, the second washing unit has the small size and it is preferred that the second washing unit is higher than the first washing machine. In case it is an independent and separate washing machine, the second washing unit has the improved reliability and durability as it is.

The small size of the washing unit results in the small volume of the drum 159. To prevent the volume of the drum from becoming too small, it is preferred that a diameter of the drum 159 is larger than the height. Corresponding to the shape and the size of the drum, the shape and size of the tub may be determined.

The limited height of the second washing unit causes the limited height of the drive unit for driving the drum, especially, the motor. That is because the height of the second washing unit is increased if the height of the motor is increased.

As mentioned above, the second washing unit is mainly used in washing a small amount of laundry or washing laundry in boiling water.

Considering the characteristics of the top load twin laundry machine and the height of the second washing unit, it is obvious that a very narrow space is formed between the lowermost surface of the tub and the lowermost surface of the second washing unit.

Wash water is heated by a tub heater provided in the tub in a sterilize-washing course and the heat generated while wash water is heated has to be radiated. However, the space is too small to radiate the heat naturally.

A stator is coupled to an outer side surface of the tub, especially, a lower outer surface and it is known that there is much room for transferring heat inside the tub to the stator. In this instance, the heat generated in the stator and the heat transferred to the stator from the tub has to be radiated effectively. In other words, the stator has to be chilled effectively. Otherwise, the motor might be damaged or it could be difficult to drive the motor efficiently.

As mentioned above, the unsmooth driving of the second washing unit is a matter of the twin laundry machine, not the matter of the second washing unit. The user purchases and uses the entire twin laundry machine from one manufacturer or one seller of the product. The user recognizes the twin laundry machine as one high-value premium product.

Referring to FIGS. 10 through 14, embodiments for chilling the motor for driving the drum in the twin laundry machine effectively will be described in detail. Especially, the motor or a rotor of the motor according to one embodiment is applied to the second washing unit of the twin laundry machine.

Figure 1:
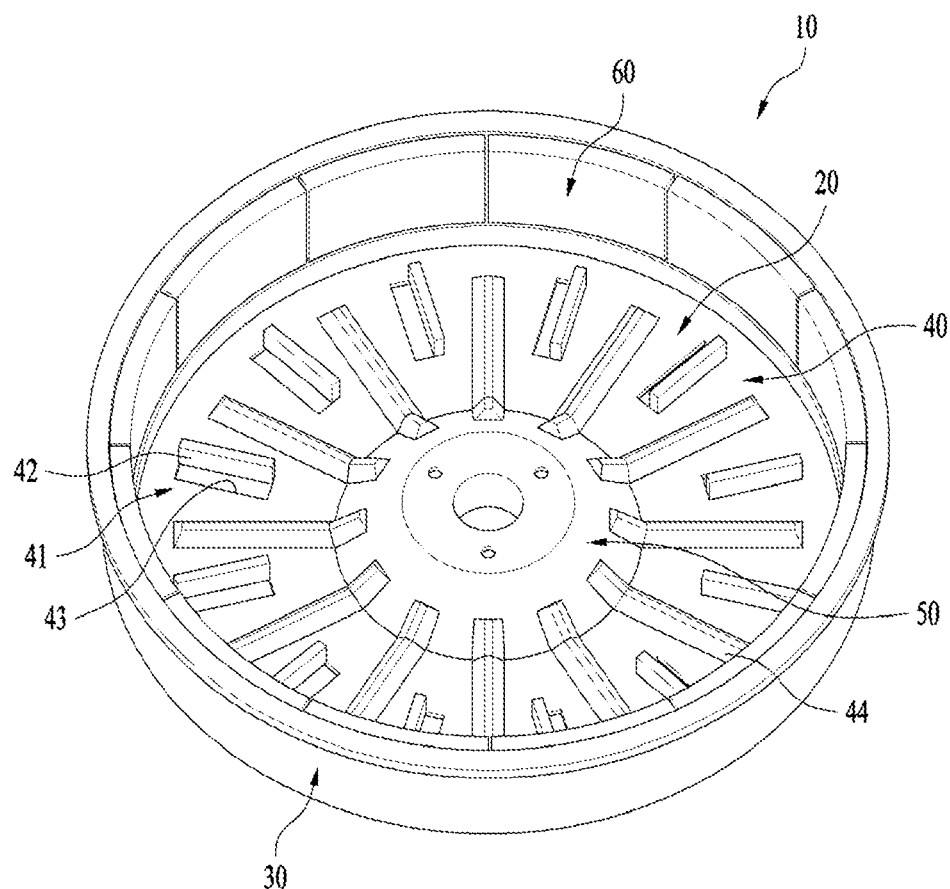
FIG. 1 is a schematic perspective diagram illustrating a rotor of a motor provided in a conventional laundry machine.
Figure 2:
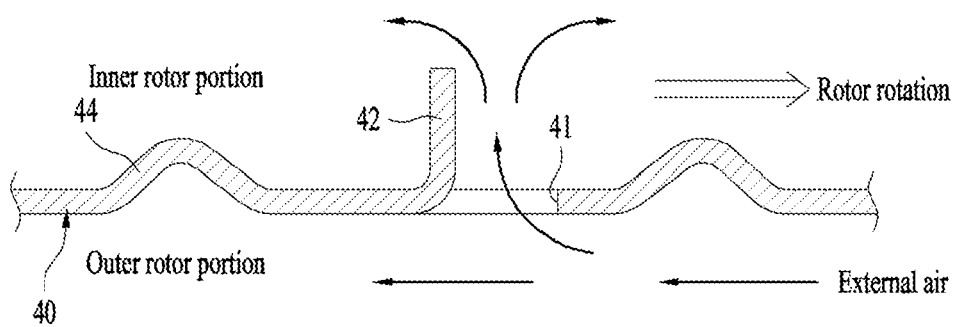
FIG. 2 is a perspective diagram of an air inlet part provided in the rotor shown in FIG. 1 in a circumferential direction.

The same or similar characteristics of the conventional rotor described, referring to FIGS. 1 and 2, are omitted. The drive unit for driving the drum which includes the motor is well known in the art to which the present disclosure pertains and detailed description of the drive unit is also omitted. Specifically, the drive unit for driving an outer type motor (a motor having a stator and a rotor rotary along an outer radial direction with respect to the stator) includes a stator; a drum shaft, a connector for connecting the rotor and the drum shaft with each other; a structure for coupling the stator to the tub; a spider for coupling the drum shaft to the drum. Such the drive unit may not belong to the technical features of the present disclosure. Accordingly, the detailed description of such the drive unit is omitted. Embodiments of the rotor which will be described herewith may be applicable to the conventional drive unit.

First of all, one embodiment of the present disclosure will be described referring to FIG. 10.

In the illustrated embodiment, a rotor frame 320 of a rotor 300 includes a side wall 330; a bottom wall 340; and an air inlet part 341. One or more magnets 360 may be provided in the side wall 330.

The air inlet part 341 may be extended in a radial direction and a plurality of air inlet parts 341 may be provided. The plurality of the air inlet parts 341 may be arranged along a circumferential direction and they may be spaced apart a preset uniform distance from each other in the circumferential direction.

The air inlet part 341 may include an opening 343 and the opening may be provided in the rotor frame 320. The opening 343 may be vertically formed in the bottom wall 340. Accordingly, external air is not sucked toward the stator from the outside of the rotor (a vertical upward direction in FIG. 10) but sucked from the outside of the rotor in a circumferential direction. In other words, external air is sucked into the rotor in a direction which is parallel with a direction along the rotation axis of the rotor or a rotational direction of the rotor, not a vertical direction with respect to the rotation axis of the rotor. Accordingly, the suction direction of external air is not distorted or curved so that external air can be sucked into the rotor more smoothly.

To form such the opening 343, the air inlet part 341 includes a plurality of side walls. Such side walls may be integrally formed with the bottom wall 340 of the rotor frame 320.

Specifically, a cut-way portion 349 extended in a radial direction may be formed in the bottom wall 340. The side wall 330, the bottom wall 340 and the hub 350 of the rotor frame 320 is integrally formed with each other and made of a steel material by pressing.

In the pressing, a projected portion 342 may be formed while the bottom wall 340 near the cut-away portion 349 is pushed upward. At this time, the opening 343 may be formed and the area of the opening 343 equals to a value gained by multiplying the length of the cut-away portion 349 by the height of the projected portion.

The projected portion 342 may be projected to a preset height toward the stator from the bottom wall 340. In a view of the reversed rotor frame 320, the projected portion 342 may be a recessed portion.

The projected or recessed portion may be formed by the plurality of the side walls only to form a preset space. External air is drawn into such the projected portion consistently so that it may be a channel for guiding air flow into the rotor frame via the opening 343. External air is sucked into the rotor along the channel and the channel may be referred to as the external air inlet channel 342 to be distinguished from a channel which will be described later.

Specifically, an inner wall 346 formed in an inner radial portion and an outer wall 345 formed in an outer radial portion may be further provided. The inner wall 346 and the outer wall 345 may be extended along a circumferential direction, so that they may be formed in a linear or curved shape.

A top of the inner wall 346 and a top of the outer wall 345 are connected with each other via an upper wall 348. The upper wall is projected upward, compared with the bottom wall 340 of the rotor frame. The bottom wall and the upper wall may be substantially perpendicular to each other. Accordingly, the upper wall is extended from a top of the inner wall toward the outer wall in an outer radial direction, to be connected to a top of the outer wall.

A front wall 347 may be formed in opposite to the opening 343 in the circumferential direction. The front wall may be extended from the bottom wall 340 in a substantially perpendicular direction with respect to the stator, like the inner wall and the outer wall. The front wall may connect the inner wall and the outer wall with each other.

In this instance, the front wall is named after the rotational direction of the rotor. A rear wall opposite to the front wall may be formed and it can be said that the opening 343 is formed in the rear wall.

Accordingly, the projected or recessed portion is formed like some space with the blocked top, right and left sides and front. The opening is formed in a rear portion of the projected or recessed portion. A bottom of the projected or recessed portion is open and a bottom of the external air inlet channel is open.

The volume of the external air inlet channel may be schematically set as follows. On explanation convenience sake, assume that the inner wall and the outer wall are the same lines with the same length. In this instance, the volume equals to a value gained by multiplying the length of the inner wall (or the outer wall), the length of the cut-away portion (or the front wall) by the projected height of the projected portion.

In other words, a certain space corresponding to the volume of the projected portion is formed in an outer portion of the rotor frame 320, specifically, the bottom wall 340 of the rotor frame. Such a space may be in direct communication with the opening 343.

When the rotor 300 is rotated in a clockwise direction, air may be sucked into the rotor frame 320 from the projected portion via the opening. Of course, new external air is filled in the external air inlet channel 342 and sucked into the rotor frame again. Cold air is not sucked into the rotor frame manually as hot air inside the rotor frame is exhausted from the rotor frame. Hot air is exhausted from the rotor frame as hold air is sucked into the rotor frame positively. Accordingly, the amount of air flow increases and the suction of cold air into the stator is facilitated enough to chill the stator.

Meanwhile, the opening 343 may be configured to exhaust air from one external air inlet channel 342. In other words, the opening 343 is defined by the bottom wall 340, the outer wall 345, the inner wall 346 and the upper wall 348 and the air guided by the walls can be sucked into the rotor frame 320 via the opening 343.

If assuming that the external air inlet channel is extended in the circumferential direction, the air guided by the bottom wall 340, the outer wall 345 and the inner wall 346 of the rotor frame is sucked into the rotor frame 320.

Accordingly, the vertex generated by the drastic change of the air flow direction near the opening 343 and vertex may be noticeably reduced and the flow velocity and flow amount of the air sucked via the opening 343 may be noticeably increased. The increase of the air flow velocity and air flow amount mean the increase of the chilling efficiency of the stator.

The external air inlet channel 342 is projected or recessed from the bottom wall and extended in the circumferential direction, with at least three surfaces, to be connected with the opening 343. The channel is the space in which external air is collected and is a guide space guiding external air to the opening 343.

The connector is coupled to the hub 350 formed in the center of the bottom wall 340 of the rotor frame 320. To couple the connector to the hub stably, a level surface 351 projected from the bottom wall 340 is provided. An outer surface 353 and an inner surface 352 may be formed in an outer portion and an inner portion with respect to the radial direction, respectively.

It is preferred that an inner surface of the hub is formed as a substantially vertical surface and that the inner surface has a predetermined radius. That is because the drum shaft is inserted through the inner surface.

The outer surface of the hub may have an inclined surface and the inclined surface may be inclined upward to the center.

The level surface, the inner surface and the outer surface of the hub are formed to be fitted to the connector. The connector formed to be fitted to the surfaces is coupled to the rotor frame 320 toward the top of the rotor frame so that the connector can be securely fitted to the hub in the radial direction. The axial and circumferential direction coupling force between the connector and the hub may be secured by auxiliary coupling means such as a bolt.

Different from what is described above, the level surface of the hub may be a predetermined portion of the bottom wall of the rotor frame. In other words, the level surface has the same plane as the bottom wall.

Figure 10:
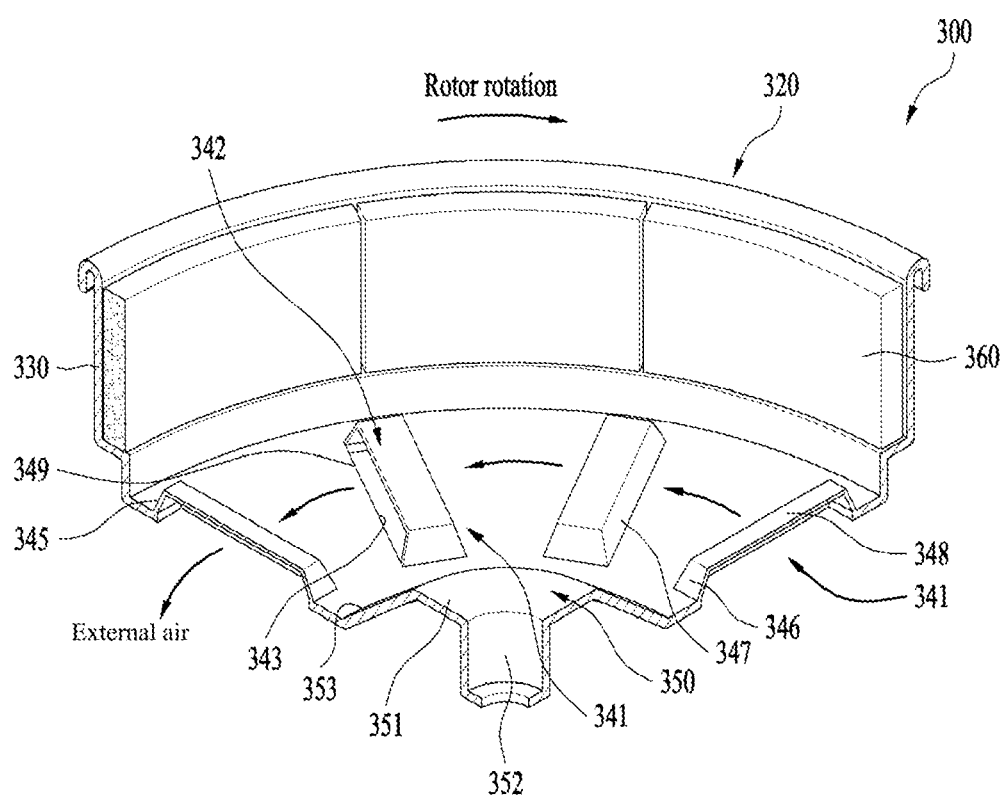
FIG. 10 is a schematic sectional diagram partially illustrating a rotor in accordance with one embodiment of the present disclosure.
Figure 11:
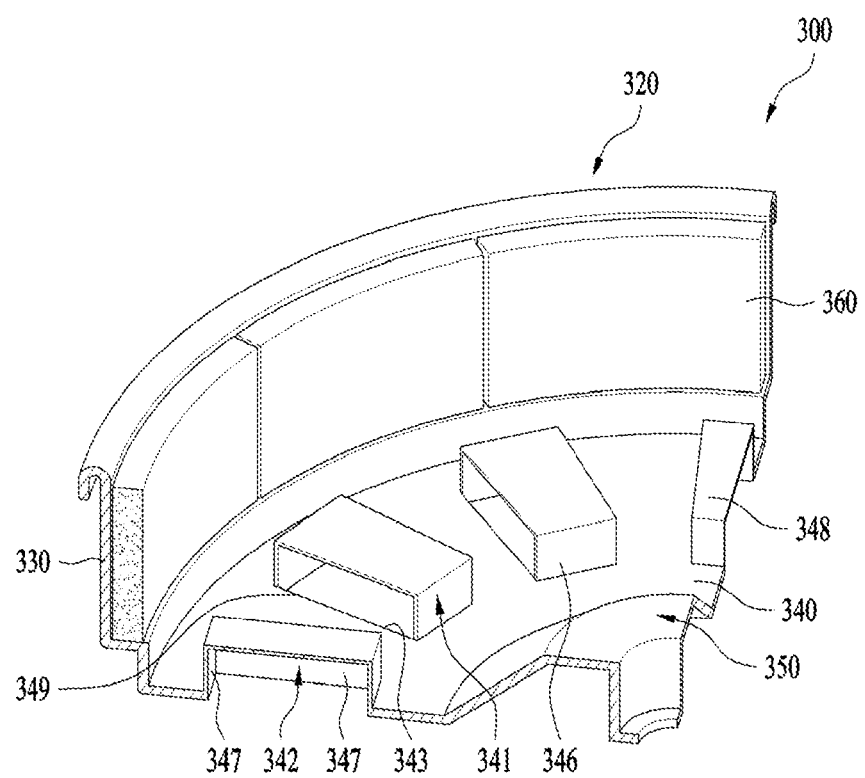
FIG. 11 is a schematic sectional diagram partially illustrating a rotor in accordance with another embodiment of the present disclosure.

Comparing FIG. 1 with FIG. 10, no embossing portion 44 is shown in FIG. 10. Specifically, the external air inlet channel forming the air inlet part 341 is capable of reinforcing the stiffness of the bottom wall 340. If assuming that the rotor shown in FIG. 1 is equal to the rotor shown in FIG. 10 in size, twice as many as the air inlet parts may be formed according to the illustrated embodiment. In other words, the number of the air inlet parts may be increased even with the same radial length of the opening 343 for sucking air into the rotor.

However, it is limited to increase the height of the opening 343 as mentioned above and it is also limited to increase the overall area of the opening by increasing the height of the opening 343. As the opening 343 is formed in the bottom wall 340, it is also limited to increase the radial length of the opening. Especially, it is preferred that the opening is formed between the side wall 330 and the hub 350 and it is limited to increase the radial length of the opening.

The opening 343 may contact with the side wall 330. In this instance, there may be no space where the side wall is able to bend and where the outer wall 345 is able to bend or there may be a narrow space. It is preferred that a predetermined radial space length is formed between the side wall 330 and the outer wall 345.

The opening 343 may contact with the hub 350. In this instance, there may be no space where the inner wall 346 is able to bend and where the hub 350 is able to bend or there may be a narrow space. It is preferred that a predetermined radial space length is formed between the hub 350 and the inner wall 346.

Meanwhile, the relation between the area of the opening and the flow amount and velocity of air will be described. The area of the opening is increasing as the radial length of the opening is increased.

If the same flow amount of air is sucked via the opening, regardless of the area of the opening, the area of the opening is small and the air flow velocity is increased more. The location of the opening is approximately corresponding to the location of the coil provided in the stator. When the length of the opening is increased, the area of the opening is increased and the air flow velocity is lowered, and air may flow in a direction which is irrelevant to the stator coil. When the location of the opening is corresponding to the location of the stator coil even with the reduced area of the opening, air may intensively flow to the stator at the increased flow velocity. In this instance, it is preferred that consecutive bottom walls 340 are provided in a radial outer portion and a radial inner portion with respect to the opening 343. In other words, it is not preferred that the opening is extended even to the radial outer portion or to the radial inner portion from a radial direction of the stator coil.

When the volume of the external air inlet channel near the opening 343 is increased, not the number of the openings 343 is increased, the chilling efficiency may be enhanced more effectively. As the openings for sucking air along the circumferential direction are formed more and more densely, the overall radial consecutive air flow is interfered more and more.

Not the number of the openings 343 but the volume of the external air inlet channel is increased to allow more external air to be sucked into the rotor frame 320 via the opening 343 effectively. In the embodiment shown in FIG. 10, a circumferential-direction gap between the air inlet part 342 becomes larger than the circumferential-direction length of the air inlet part 341.

Specifically, the air inlet part 341 includes the inner wall 346 and the outer wall 345. It is preferred that the circumferential-direction length of the inner wall 346 is different from that of the inner wall 346. In other words, the inner wall 346 may be longer than the outer wall so that the air inlet part 341 may be formed in a fan shape.

The circumferential-direction gap between the air inlet parts 341 may be larger than the circumferential-direction length of the air inlet part 341. As the circumferential-direction length of the channel 342 is increased, the sizes become different from each other. In other words, as the circumferential-direction length of the channel 342 is increased, the circumferential-direction gap between the air inlet parts 341 becomes smaller than that of the air inlet part 341.

At this time, the air sucked via one of the air inlet parts 341 may run against the front wall 347 of the air inlet part 341 nearby only to interfere with smooth air flow. To solve that, the front wall 347 and the upper wall 348 may form an acute angle, not the right angle. Alternatively, the front wall 347 and the upper wall 348 may be connected with each other by a curved line and both of the walls form one curved wall. In this instance, the angle or shape formed by the rear wall and the upper wall becomes different, the shape of the outer wall 345 and the inner wall 346 may become different.

Figure 12:
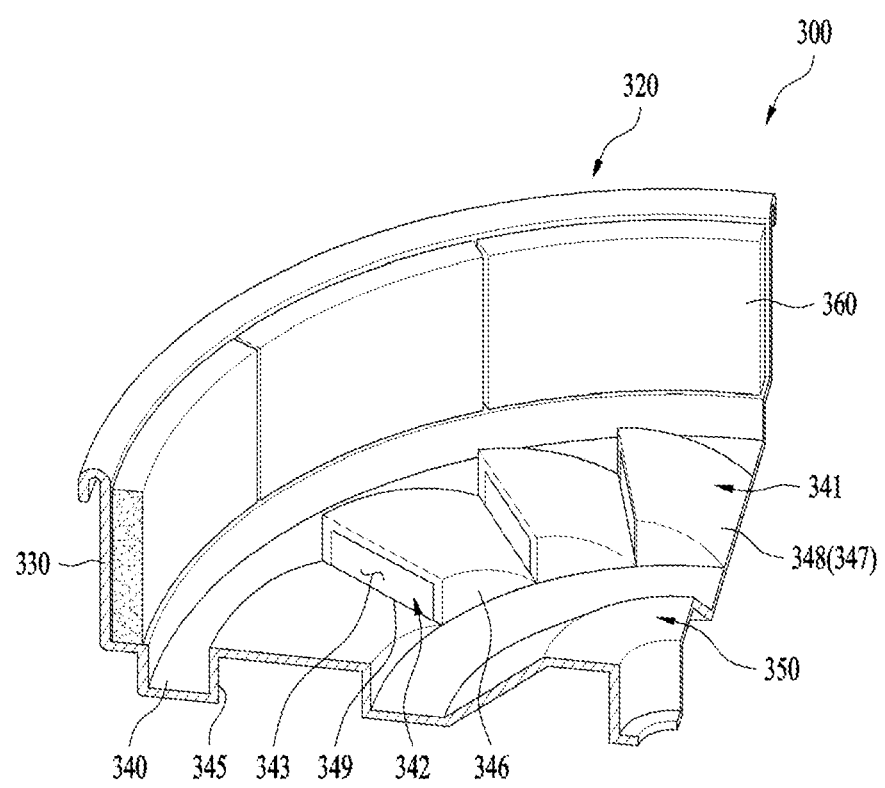
FIG. 12 is a schematic sectional diagram partially illustrating a rotor in accordance with a further embodiment of the present disclosure.

To achieve the object that the volume of the projected portion 342 in which external air is stored has to be increased and that one air inlet part has not to interfere with the flow of the air sucked via the neighboring air inlet part, the embodiment shown in FIG. 12 may be proposed.

As shown in the drawing, the plurality of the air inlet parts may be formed along a radial direction consecutively. At this time, the rear wall and the upper wall 348 of the air inlet part 341 may be formed as one inclined wall or curved wall. The air sucked via one air inlet part 341 rises and flows along the inclined or curved wall of one neighboring air inlet part in the circumferential direction. The smooth air flow and air rise may be performed by structural characteristics of the projected portion 342.

In the illustrated embodiment, the plurality of the air inlet parts 341 may be consecutively arranged along the circumferential direction. The circumferential-direction length of the outer wall 346 has to be longer than the circumferential-direction length of the inner wall 346.

Hereinafter, another embodiment of the present disclosure will be described referring to FIG. 13. The embodiment shown in FIG. 13 may be combinedly applied to the embodiment described referring to FIGS. 10 through 12.

According to the illustrated embodiment similar to the embodiments mentioned above, the external air inlet channel 342 is provided and an external air supply channel 365 in communication with the external air inlet channel 342 may be provided.

As mentioned above, external air is collected via the external air inlet channel 341 and the collected air may be guided into the rotor frame 320. It is preferred in the illustrated embodiment that the external air supply channel 365 is formed to suck a large amount of external air into the external air inlet channel 341, eventually, the rotor frame 320.

The external air supply channel 365 is the channel formed in the circumferential direction and recessed or projected from the bottom wall 340. The bottom wall 340 is partially projected toward the stator to form the external air supply channel 365.

The external air supply channel 365 may be formed in a ring shape and in an inner portion with respect to the radial direction of the external air inlet channel 342. Specifically, the external air supply channel 365 may be formed between the external air inlet channel 342 and the hub 350.

The projected height of the external air supply channel 365 may be equal to that of the external air inlet channel 342. Accordingly, the upper walls of the both channels may be consecutive at the same height.

In this instance, the external air supply channel 365 may be in communication with the external air inlet channel 342.

The external air supply channel 365 includes an inner wall 363 and an outer wall 361. The inner wall may be formed consecutively along the circumferential direction. In other words, the inner wall is completely blocked along the circumferential direction. The outer wall 361 and the inner wall 363 may be connected with each other by the upper wall 362. The upper wall 362 may be the level wall projected upward from the bottom wall 340.

The outer wall 361 may be formed along the circumferential direction not consecutively but intermittently. Specifically, the external air inlet channel 342 communicates with the external air supply channel 365 through the area in which the outer wall 361 is not formed.

The outer wall 361 may be may be extended from the opening of one air inlet part 341 to the front wall 347 of the neighboring air inlet part 341.

Such the external air supply channel 365 may provide following effects.

The external air supply channel 365 is configured to collect the air flow along the circumferential direction from an outer bottom surface of the rotor frame 320. As the rotor frame 320 is rotated, air near the external bottom surface of the rotor frame is collected in the external air supply channel 365. Especially, ambient air in the center of the rotor frame flows in an outer radial direction and be collected in the external air supply channel 365.

The air flowing along the external air supply channel 365 is guided to the external air inlet channel 342 to be sucked into the rotor.

To suck air via one opening 343, air has to be sucked in an inner radial-direction portion and an outer radial-direction portion of the opening smoothly. Accordingly, the air flow is collected in the inner radial-direction portion through the external air supply channel 365 and supplied to the external air inlet channel 342.

The air may be sucked into the rotor more smoothly and effectively than a large amount of external air.

Meanwhile, the external air supply channel 365 and the external air inlet channel 342 may be provided as one channel. At this time, an outer wall of the external air inlet channel may be a first wall and an outer wall of the external air supply channel may be a second wall. An inner wall of the external air supply channel may be a third wall. Those walls may be spaced a preset distance apart from each other in the radial direction.

When the external air supply channel and the external air inlet channel are provided as one channel, a side wall having an opening may be a first side wall and a front wall of the external air inlet channel may be a second side wall. Upper walls of the external air inlet channel and the external air supply channel may be third side walls.

Accordingly, the uni-channel may be formed by the first wall, the second wall, the third wall, the first side wall and the third side walls. As mentioned above, the second side wall and the third side wall may form a uni-side wall by using one inclined or curved surface.

The external air supply channel 365 will be described in detail. While they are described as independent components in the embodiment described above, the external air supply channel 365 and the external air inlet channel 342 are united as one channel.

In the illustrated embodiment, the external air supply channel 365 is formed in the rotor frame 320 to suck a much amount of external air into the rotor frame 320.

The external air supply channel 365 is formed along a circumferential direction and recessed or projected from the bottom wall 340 of the rotor frame 320 so that external air outside the rotor frame 320 can be collected and flow. In other words, a predetermined region of the bottom wall 340 is projected toward the stator and an outer region of the bottom wall is recessed in a circular shape. Specifically, seen from the inside of the rotor frame 320, the external air supply channel 365 is projected in a circular shape. Seen from the outside of the rotor frame 320, the external air supply channel 365 is recessed in a circular shape.

The external air supply channel 365 may include an external wall 363 and an external wall 361. The external wall 363 is completely embedded along a circumferential direction. The external wall 361 may be formed to communicate with an internal space of the external air supply channel 365 along the circumferential direction. One or more certain sections of the outer wall 361 are blocked and another one or more certain sections are open, so that internal air of the external air supply channel 365 may flow outside through the open sections of the external wall 361.

The blocked sections and the open sections may be alternatively formed in the external wall 361 along the circumferential direction.

It is preferred that the outer wall 361 is connected with the internal wall 363 via the upper wall 362. It can be said that the upper wall 362 is a horizontal wall projected from the bottom wall 340.

When the upper wall 362 is formed by pressing, the upper tall 362 may be partially projected to the outside of the frame (in the reverse direction of the stator). In other words, a predetermined portion of the horizontal upper wall 362 is projected downward to serve as a blade 362a for facilitating flow of external air in the external air supply channel 365.

As one alternative embodiment, the external wall 361 may be bending along the circumferential direction. The external air supply channel 365 may include a narrow region 381 having a narrow width (h) and a wide region 382 having a relatively wide width (H) between the internal wall 363 and the external wall 361. In this instance, the width (H) is larger than the width (h). Specifically, the external wall 361 is extended along the circumferential direction in the narrow region 381 and the wide region 382 and along a radial direction in a region in which the narrow region meets the wide region. Accordingly, the internal wall of the external air supply channel 365 is a continuous wall with the same radius and the external wall is a wall formed by alternative connecting of a wall with a small radius and a wall with a large radius. To put it plainly, it can be said that the external wall of the external air supply channel 365 is formed in a serration (or a saw-tooth) shape.

More specifically, the external wall 361 may include a wall in a circumferential direction (hereinafter, a circumferential-direction wall) 361a facing the internal wall 363 in the narrow region 381; and a wall in a circumferential wall (hereinafter, a circumferential-direction wall) 361b facing the internal wall 363 in the wide region. The external wall 361 may include a wall in a radial direction (hereinafter, a radial-direction wall) 361c bending in a radial direction to intersect the internal wall 363. The radius of the circumferential-direction wall 361a is smaller than that of the other circumferential-direction wall 361b.

An external air inlet part 373 may be formed in the radial-direction wall 361c of the external wall in opposite to one end of the narrow region 381. The external air inlet part 373 may be the same configuration as the opening 343 in an aspect of the external air inlet channel 342. In this instance, the radial-direction wall 361c may be configured of a front wall portion and a rear wall portion with respect to the rotational direction of the rotor frame 320. It is preferred that the external air inlet part 373 is formed in the rear wall portion.

While spread in the wide region 382, the external air penetrating the narrow region 381 via the external air inlet hole 373 can be sucked into the external air inlet hole 373. The radial-direction wall in opposite to the external air inlet hole 373, in other words, the front wall portion may be configured to cause flow of external air in the external air supply channel 365, in other words, function as blade.

The external wall 361a of the narrow region 381 may be inclined. In other words, the one end of the circumferential-direction wall of the narrow region 381 is formed outer or inner to the other end in a radial direction. It is preferred that a front portion is outer to a rear portion in a radial direction with respect to the rotational direction of the rotor. In this instance, the radial-direction length of the front wall portion is larger than that of the rear wall portion in the radial-direction wall 361c. Accordingly, the external air supply channel 365 may be formed in pin wheel shape.

The external air inlet hole 373 may be additionally formed in the inclined external wall 361a of the narrow region 381. The external air inlet hole 373 is formed in a direction, which intersects the rotational direction of the rotor, not only in the wide region 382 but also the narrow region 381 so that external air can be sucked into the rotor at the same velocity of flow without getting bent.

As another alternative embodiment even though not illustrated, the external air 361 may be formed continuous in circumferential direction and the internal wall may be formed discontinuous. In other words, the internal wall 363 may be intermittent or bent. The structure of the internal wall may be equal to that of the external wall described in the illustrated embodiment above. To put it plainly, the radial-direction inside and outside of the air inlet part 341 or the external inlet channel 365 shown in FIG. 13 are reversed. In other words, not the radial-direction outside but the radial-direction inside is saw-toothed.

As a further alternative embodiment not illustrated, both of the external and external walls 361 and 363 may be intermittent or bent in the radial direction. To put it plainly, both of the radial-direction inside and outside of the air inlet part 341 or the external air inlet channel 365 shown in FIG. 13 may be saw-toothed.

At this time, the internal external walls include radial-direction walls which face each other in the narrow region 381 in a circumferential direction and which are bent in the wide region 382 in the opposite direction. The radial-direction inner saw-teeth and the radial outer saw-teeth have the same center in a circumferential direction.

The external air supply channel 365 mentioned above may provide following effects.

The external air supply channel 365 is able to perform the function of collecting external air flow from the external bottom surface of the rotor frame 320 along the circumferential direction. In other words, air near the outer bottom surface of the rotor frame is collected in the external air supply channel 365 along the rotation of the rotor frame 320.

Especially, air near the center of the rotor frame flows in an outer radial direction to be collected in the external air supply channel 365. The air flowing along the external air supply channel 365 is guided toward the external air inlet hole 373 and drawn into the rotor.

Accordingly, external air may be sucked into the rotor very effectively and smoothly and the heat inside the rotor may be exhausted outside very effectively and efficiently.

Figure 13:
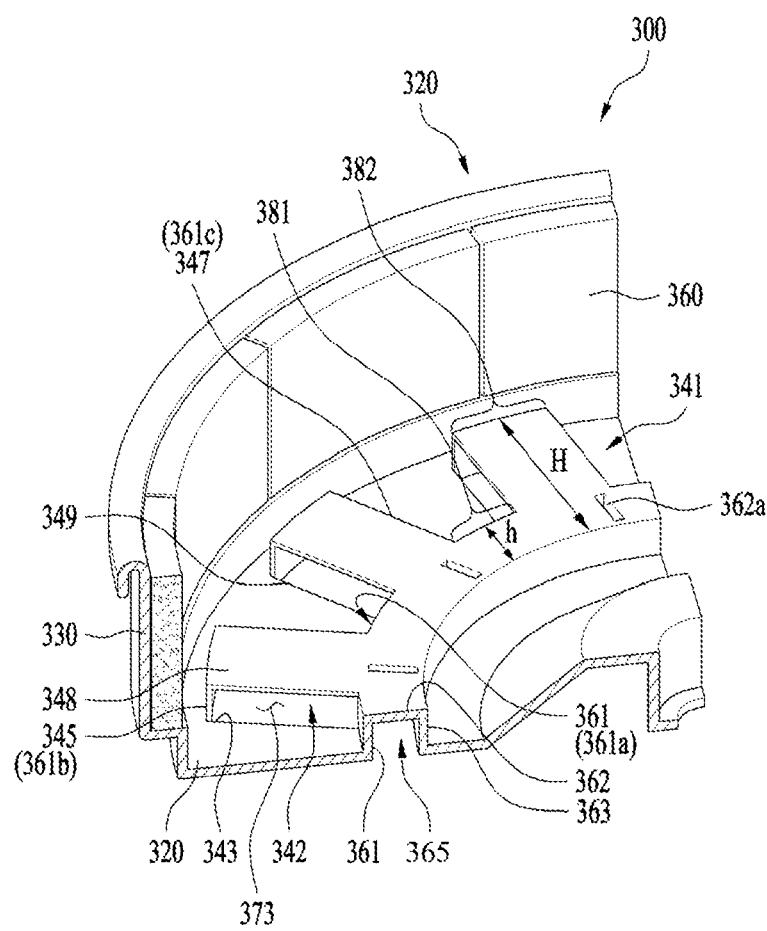
FIG. 13 is a schematic sectional diagram partially illustrating a rotor in accordance with a still further embodiment of the present disclosure.
Figure 14:
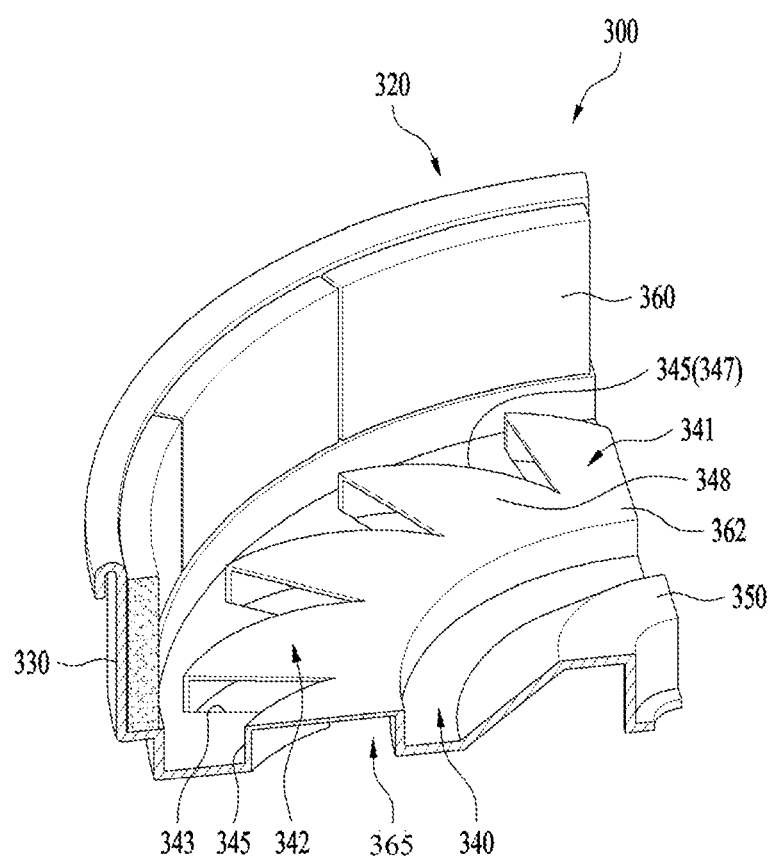
FIG. 14 is a schematic sectional diagram partially illustrating a rotor in accordance with a still further embodiment of the present disclosure.

FIG. 14 is a diagram illustrating one example modified from the embodiment shown in FIG. 13.

The illustrated example is characterized in that the external air inlet channel is formed in a spiral shape. The air rotated in the circumferential direction in the external air supply channel flows to the outer portion with respect to the radial direction and to the external air inlet channel. At this time, air flow resistance may be generated. Accordingly, the external air inlet channel is formed in the spiral shape and the air flow resistance may be reduced.

In this instance, an outer surface and a front surface of the external air inlet channel are connected with each other so as to form a uni-curved surface. Accordingly, the flow direction of air may not be changed suddenly but be guided smoothly into the rotor.

Moreover, the outer surface and the front surface may function as blades, so that air flow outside the rotor frame can be facilitated more smoothly by the blades. Accordingly, the air can be sucked into the rotor frame more effectively.

The rotor frame is made by pressing in the embodiments mentioned above. In other words, the entire rotor frame may be made of one material as one body. A level steel plate is pressed, bent and cut to integrally form the side wall, the hub and the air inlet parts as one body.

In the structure of the air inlet part which is different from what is described above, the side walls are not bent perpendicularly and consecutively. The side walls are perpendicular to each other and corners are rounded to be consecutive.

Different from the steel plate pressing, the rotor frame may be formed by dye casting. In this instance, it may be possible to form the complex shape of the air inlet part more precisely.

Even when all of the components which consist of the embodiments are combined with each other as one body, the present disclosure is not necessarily limited to the embodiments described above. The foregoing embodiments are merely exemplary and are not to be considered as limiting the present disclosure.

The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The following is an embodiments list.

1. A twin laundry machine comprising: a first washing unit comprising a first tub, a first drum and a first drive unit for driving the first drum; a second washing unit comprising a second tub, a second drum and a second drive unit for driving the second drum, wherein the second drum has a diameter which is larger than the height and a rotation axis which intersects a rotation axis of the first drum, the second drive unit comprises a stator fixed to an outer surface of a bottom wall of the second tub; a drum shaft connected to the second drum, penetrating the second tub; and a rotor coupled to the drum shaft and rotatably surrounding the stator, and the rotor comprises a rotor frame; a magnet; and a connector for connecting the rotor frame and the drum shaft with each other, and the rotor frame comprises a side wall in which the magnet is mounted; a bottom wall horizontally extended from a lower end of the side wall; and an air inlet part formed in the bottom wall, and the air inlet part comprises, a first wall projected toward the stator and formed in a circumferential direction to face a side wall of the rotor;

a second wall projected toward the stator from an inner portion of the rotor side wall in a radial direction with respect to the first wall and alternate with the first wall in a circumferential direction;

a third wall projected in a circumferential direction from an inner portion of the rotor side wall in a radial direction with respect to the second wall to face the first wall and the second wall; and a plurality of side walls for connecting the first wall and the second wall with each other, and the side wall comprises a first side wall for connecting one end of the first wall and one end of the neighboring second wall with each other; and a second side wall for connecting the other end of the first wall and one end of the neighboring second wall, and an opening in which air is sucked into the rotor frame is formed in the first side wall.

2. The twin laundry machine of embodiment 1, wherein the second washing unit is separable from the first washing unit.

3. The twin laundry machine of embodiment 1, wherein the second tub and the second drum are vertically arranged in the second washing unit.

4. The twin laundry machine of embodiment 3, wherein the second washing unit is arranged on a top of the first washing machine.

5. The twin laundry machine of embodiment 1, wherein the rotor comprises a hub projected from a center of the bottom wall toward the drum shaft and comprising a horizontal surface opposite to the stator and a vertical surface opposite to the drum shaft.

6. The twin laundry machine of embodiment 5, wherein the connector is made of a plastic material and coupled to the drum shaft to be coupled to the rotor frame, in close contact with the horizontal surface and the vertical surface of the hub.

7. The twin laundry machine of embodiment 6, wherein the hub comprises another vertical surface opposite to the second wall of the air inlet part and projected toward the stator.

8. The twin laundry machine of embodiment 6, wherein the horizontal surface of the hub is a bottom wall of the rotor near the third wall of the air inlet part.

9. The twin laundry machine of embodiment 1, wherein the second side wall of the air inlet part forms a front side with respect to a rotational direction of the rotor, and the first side wall in which the opening is formed to suck air forms a rear side with respect to the rotational direction of the rotor.

10. The twin laundry machine of embodiment 1, wherein an opening formed in a first side wall of the air inlet part is vertically formed with respect to a bottom surface of the rotor.

11. The twin laundry machine of embodiment 1, wherein a second side wall of the air inlet part is longer than a first side wall in which the opening is formed.

12. The twin laundry machine of embodiment 1, wherein one side of the second wall of the air inlet part is closer to the side wall of the rotor than the other side in a radial direction.

13. The twin laundry machine of embodiment 12, wherein a first side wall of the air inlet part is connected with one side of the second wall formed close to the side wall of the rotor in the radial direction.

14. The twin laundry machine of embodiment 12, wherein a predetermined front portion of the second wall of the air inlet part with respect to the rotation direction of the rotor is closer to the side wall of the rotor in the radial direction than the other rear portion.

15. The twin laundry machine of embodiment 1, wherein the second wall of the air inlet part further comprises an opening in which air is able to be sucked.

16. A drive unit of a laundry machine comprising a tub; a drum mounted in the tub and configured to wash laundry; the drive unit connected to a drum shaft penetrating the tub and configured to drive the drum, the drive unit comprising:

a stator fixed to an outer surface of a bottom wall provided in the tub; and a rotor coupled to the drum shaft and supported to rotate, with surrounding the stator, wherein the rotor comprises, a rotor frame; a magnet; and a connector for connecting the rotor frame and the drum shaft with each other, and the rotor frame comprises, a side wall for seating the magnet therein; and a bottom wall horizontally extended from a lower end of the side wall, and an external air supply channel is projected from the stator toward the stator in a circumferential direction to be recessed from an outer surface of the bottom wall continuously, and the external air supply channel comprises, an internal wall formed in a radial direction and an external wall formed in the radial direction;

an external wall formed outer to the internal wall in a radial direction;

a narrow region having a relatively narrow width between the internal wall and the external wall; and a wide region having a relatively wide width between the internal wall and the external wall, and an external air inlet hole is formed an internal or external wall portion of the wide region which faces one end of the narrow region.

17. The drive unit of the laundry machine of embodiment 16, wherein the internal wall of the external air supply channel is continuously formed in a circumferential direction and the external wall is bending in the circumferential direction.

18. The drive unit of the laundry machine of embodiment 17, wherein the external wall comprises,
a circumferential-direction wall facing the internal wall in the narrow region and bending in a radial direction to intersect the internal wall in the wide region; and
a radial-direction wall bending in a radial direction in the wide region to intersect the internal wall.

19. The drive unit of the laundry machine of embodiment 18, wherein the external air inlet hole is formed in one of the radial-direction walls provided in the external wall.

20. The drive unit of the laundry machine of embodiment 19, wherein the external air inlet hole is located in a rear one of the radial-direction walls of the external wall with respect to the rotational direction of the rotor.

21. The drive unit of the laundry machine of embodiment 18, wherein the circumferential-direction wall is inclined along the circumferential direction in the narrow region or the wide region.

22. The drive unit of the laundry machine of embodiment 21, wherein a front portion of the radial-direction wall is outer to a rear portion in the narrow region in a radial direction with respect to the rotational direction of the rotor.

23. The drive unit of the laundry machine of embodiment 22, wherein the external air inlet hole is additionally formed in the circumferential-direction wall in the narrow region.

24. The drive unit of the laundry machine of embodiment 18, wherein the radial-direction wall is bent perpendicular to the internal wall in the wide region.

25. The drive unit of the laundry machine of embodiment 16, wherein the external wall of the external air supply channel is continuously formed in a circumferential direction and the internal wall is bent in the circumferential direction.

26. The drive unit of the laundry machine of embodiment 25, wherein the internal wall comprises,
a radial-direction wall facing the external wall in the narrow region;
a radial-direction wall bent inward in a radial direction to intersect the external wall in the wide region.

27. The drive unit of the laundry machine of embodiment 26, wherein the external air inlet hole is formed in one of the radial-direction walls provided in the internal wall.

28. The drive unit of the laundry machine of embodiment 27, wherein the external air inlet hole is located in a rear one of the radial-direction walls of the internal wall with respect to the rotational direction of the rotor.

29. The drive unit of the laundry machine of embodiment 26, wherein the circumferential-direction wall is inclined along the circumferential direction in the narrow region or the wide region.

30. The drive unit of the laundry machine of embodiment 29, wherein a front portion of the radial-direction wall is outer to a rear portion in the narrow region in a radial direction with respect to the rotational direction of the rotor.

31. The drive unit of the laundry machine of embodiment 50, wherein the external air inlet hole is additionally formed in the circumferential-direction wall in the narrow region.

32. The drive unit of the laundry machine of embodiment 24, wherein the radial-direction wall is bent perpendicular to the external wall in the wide region.

33. The drive unit of the laundry machine of embodiment 16, wherein the internal wall and the external wall are bent in the circumferential direction.

34. The drive unit of the laundry machine of embodiment 33, wherein the internal and external walls comprise circumferential-direction walls facing each other in the narrow region; and
Radial-direction walls bent in an opposite direction in the wide region.

35. The drive unit of the laundry machine of embodiment 34, wherein the external air inlet hole is formed in one of the radial-direction walls in the wide region.

36. A laundry machine comprising:
a first washing unit comprising a first tub and a first motor for driving the first tub;
a second washing unit comprising a second tub and a second motor for driving the second tub;
a first controller for controlling the first washing unit; and
a second controller for controlling the second washing unit,
wherein the first controller categorizes operations of the first motor for performing washing, rinsing and spinning cycles according to operation settings by motion unit, and sets the time period in which the first motor performs one motion one time as one operation-on period and controls an operation-on period of the first motor and an operation-on period of the second motor not to be overlapped with each other.

37. The laundry machine of embodiment 36, wherein the first controller controls the first motor to perform the motion configured to give a washing effect to the laundry loaded in the tub by combining one or more of the clockwise rotation, pausing, counter-clockwise rotation, high-velocity rotation and low-velocity rotation for the first operation-on period.

38. The laundry machine of embodiment 37, wherein the first controller controls the first motor by setting one of laundry entangling, laundry soaking, detergent dissolving and laundry rubbing for giving a washing effect to the laundry as the motion.

39. The laundry machine of embodiment 36, wherein the first motor repeats power-on and power off predetermined times for the operation-on period, corresponding to the motion.

40. The laundry machine of embodiment 36, wherein the first motor continues the operation for the operation-on period, corresponding to the motion.

41. The laundry machine of embodiment 36, wherein the first controller controls the operation-on period of the first motor and the operation-on period of the second motor not to be overlapped with each other by constant communication with the second controller.

42. The laundry machine of embodiment 36, wherein the first controller controls the first motor to perform a first motion for a first operation-on period, and
the second controller sets a first operation-off period for the second motor to standby for the first operation-on period.

43. The laundry machine of embodiment 42, wherein the second controller sets the first operation-off period which has the same size as the first operation-on period.

44. The laundry machine of embodiment 42, wherein the first controller controls the first motor to perform the first motion one time and controls the first motor to standby for a second operation-off period when the first opening-on period ends, and
the second controller controls the second motor to perform a second motion for a second operation-on period when the first operation-on period ends.

45. The laundry machine of embodiment 44, wherein the first controller sets the second operation-off period, corresponding to the second operation-on period of the second motor.

46. The laundry machine of embodiment 44, wherein the first controller sets the operation-off period for the first motion which is set in case the first washing unit is operated alone to be different from the second operation-off period.

47. The laundry machine of embodiment 44, wherein the first controller controls the first motor to perform a third motion for a third operation-on period when the second operation-on period ends, and the second controller sets a third operation-off period for the second motor to standby for the third operation-on period.

48. The laundry machine of embodiment 44, wherein the first controller controls the first motor to perform the first motion one more time for a fourth operation-on period when the second operation-on period ends, and the second controller sets a fourth operation-off period for the second motor to standby for the fourth operation-on period.

49. The laundry machine of embodiment 47, wherein the first operation-on period, the second operation-on period and the third operation-on period are different in size.

50. A control method of a laundry machine comprising a first washing unit comprising a first tub and a first motor for driving the first tub; a second washing unit comprising a second tub and a second motor for driving the second tub, the control method comprises, a step for controlling the first motor to perform a first motion of the motions implemented to give the laundry loaded in the first tub certain washing effects for a first operation-on period;

a step for controlling the second motor to standby for a first operation-off, corresponding to the first operation-on period;

a step for controlling the second motor to perform a second motion of the motions for a second operation-on period, when the first operation-on period ends;

a step for controlling the first motor to standby for a second operation-off period, corresponding to the second operation-on period; and a step for controlling the first motor and the second motor to perform the motions combined with the plurality of the operations for operation-on periods which are set not to be overlapped with each other, respectively.

51. The control method of the laundry machine of embodiment 50, further comprising:

a step for setting each operation-on period and operation-off period for the next motion for the operation-on periods of the first motor not to be overlapped with the operation-on periods of the second motor by communication between the first controller of the first washing unit and the second controller of the second washing unit, when one operation-on period of the first or second motor ends.

52. The control method of the laundry machine of embodiment 50, further comprising:

a step for controlling the first controller to set the time taken to perform the first motion one time as the first operation-on period, before the first motor performs the first motion; and a step for controlling the second controller to set the first operation-off period for the second motor, corresponding to the first operation-on period.

53. The control method of the laundry machine of embodiment 51, further comprising:

a step for controlling the second controller to set the time taken to perform the second motion one time as the second operation-on period before the second motor performs the second motion; and a step for controlling the first controller to set the second operation-off period, corresponding to the second operation-on period.

54. The control method of the laundry machine of embodiment 50, wherein the operation-on period for the first motion is set different from the second operation-off period, when the first washing unit is operated along.

55. The control method of the laundry machine of embodiment 50, wherein the size of the operation-off period in which the second motor standbys, not operating, is set corresponding to the size of the operation-on period in which the first motor is being operated, and the size of the operation-off period in which the first motor standbys, not operating, is set corresponding to the size of the operation-on period in which the second motor is being operated.

56. The control method of the laundry machine of embodiment 50, further comprising:

a step for controlling the first motor to perform a third motion for a third operation-on period, when the second operation-on period ends; and a step for controlling the second motor to standby for a third operation-off period which is set corresponding to the third operation-on period.

57. The control method of the laundry machine of embodiment 50, further comprising:

a step for controlling the first motor to perform the first motion one more time for a fourth operation-on period, when the second operation-on period ends; and a step for controlling the second motor to standby for a fourth operation-off period which is set in the second motor, corresponding to the fourth operation-on period.

58. The control method of the laundry machine of embodiment 56, wherein the first operation-on period, the second operation-on period and the third operation-on period are different in size.

59. The control method of the laundry machine of embodiment 50, wherein the motion is set to give a washing effect to the laundry loaded in the tub by combining one or more of the clockwise rotation, pausing, counter-clockwise rotation, high-velocity rotation and low-velocity rotation for the first operation-on period.

What is claimed is:

1. A method for controlling a laundry machine, the laundry machine including (i) a first washing unit comprising a first tub, a first drum mounted in the first tub, a first motor configured to drive a rotation of the first drum within the first tub, and a first transceiver, and (ii) a second washing unit comprising a second tub, a second drum mounted in the second tub, a second motor configured to drive a rotation of the second drum within the second tub, and a second transceiver, the method comprising:

exchanging, by the first transceiver and the second transceiver, washing-related data;

controlling the first washing unit to perform a first washing effect, the first washing effect including an operation-on period during which the first motor is operated and an operation-off period during which the first motor is on standby; and controlling the second washing unit to perform a second washing effect, the second washing effect including an operation-on period during which the second motor is operated and an operation-off period during which the second motor is on standby, wherein the first washing effect and the second washing effect are performed simultaneously, and wherein the operation-on period of the first washing unit is controlled not to overlap with the operation-on period of the second washing unit based on the exchanged washing-related data, and wherein the exchanged washing-related data comprises at least one of (i) data related to setting of a washing course or (ii) data related to an operation of the first and second motors.

2. The method of claim 1, wherein controlling the first washing unit to perform the first washing effect includes sequentially alternating between operation-on and operation-off periods for the first motor, and wherein controlling the second washing unit to perform the second washing effect includes sequentially alternating between operation-on and operation-off periods for the second motor.

3. The method of claim 1, wherein controlling the second washing unit includes starting a first operation-on period of the second washing unit based on completion of a first operation-on period of the first washing unit.

4. The method of claim 3, wherein controlling the first washing unit includes starting a second operation-on period of the first washing unit based on completion of the first operation-on period of the second washing unit.

5. The method of claim 3, wherein controlling the first washing unit includes: after the first operation-on period of the first washing unit is completed, turning off the operation of the first washing unit until the first operation-on period of the second washing unit is completed, wherein, while the operation of the first washing unit is turned off, the first motor of the first washing unit is in a standby state.

6. The method of claim 4, wherein controlling the second washing unit includes: after the first operation-on period of the second washing unit is completed, turning off the operation of the second washing unit until the second operation-on period of the first washing unit is completed, wherein, while the operation of the second washing unit is turned off, the second motor of the second washing unit is in a standby state.

7. The method of claim 2, wherein the first washing effect and the second washing effect are started simultaneously, and wherein the first motor is initially controlled to be in a first operation-on period and the second motor is initially controlled to be in a first operation-off period.

8. The method of claim 7, wherein controlling the second washing unit includes turning off the operation of the second washing unit until the first operation-on period of the first washing unit is completed.

9. The method of claim 1, wherein the first washing unit includes a first controller for controlling the first washing unit, and the second washing unit includes a second controller for controlling the second washing unit, the method further comprising:

based on the first washing unit being in a first operation-on period, transmitting a first operation signal from the first controller to the second controller indicating that the first washing unit is in the first operation-on period; and based on the second controller receiving the first operation signal from the first controller indicating that the first washing unit is in the first operation-on period, controlling the second washing unit to enter a first operation-off period and remain in standby.

10. The method of claim 9, further comprising:

based on the first washing unit entering a second operation-off period following the first operation-on period, transmitting a first pause signal from the first controller to the second controller indicating that the first washing unit is in the second operation-off period;

based on the second controller receiving the first pause signal from the first controller indicating that the first washing unit is in the second operation-off period, controlling the second washing unit to enter a second operation-on period;

based on the second washing unit being in the second operation-on period, transmitting a second operation signal from the second controller to the first controller indicating that the second washing unit is in the second operation-on period; and based on the first controller receiving the second operation signal from the second controller indicating that the second washing unit is in the second operation-on period, controlling the first washing unit to remain in standby.

11. The method of claim 10, further comprising:

based on the second washing unit entering a third operation-off period following the second operation-on period, transmitting a second pause signal from the second controller to the first controller indicating that the second washing unit is in the third operation-off period; and based on the first controller receiving the second pause signal from the second controller indicating that the second washing unit is in the third operation-off period, controlling the first washing unit to enter a third operation-on period.

12. The method of claim 1, wherein the first washing effect includes two or more preset operation-on periods that are separated by a first preset operation-off period of the first washing unit, and wherein the second washing effect includes two or more preset operation-on periods that are separated by a second preset operation-off period of the second washing unit, the method further comprising:

increasing a standby period of the first motor beyond the first preset operation-off period or a standby period of the second motor beyond the second preset operation-off period to thereby prevent the operation-on period of the first washing unit from overlapping with the operation-on period of the second washing unit.

13. The method of claim 1, wherein only one of the first motor or the second motor is operated at one time.

14. The method of claim 1, wherein each of the first and second washing effects performed by the first and second motors, respectively, include one or more of clockwise rotation, pausing, counter-clockwise rotation, high-velocity rotation, and low-velocity rotation.

15. The method of claim 1, wherein a single operation-on period includes a plurality of motor operations.

16. The method of claim 1, wherein a single operation-on period includes a single continuous motor operation.

17. The method of claim 1, wherein the laundry machine includes an integral cabinet that houses the first washing unit and the second washing unit.

18. A twin laundry machine comprising:

a first washing unit including:
 a first tub,
 a first drum mounted in the first tub,
 a first motor configured to drive a rotation of the first drum within the first tub,
 a first transceiver, and a first controller configured to control the first motor;
a second washing unit including:
  a second tub,
  a second drum mounted in the second tub,
  a second motor configured to drive a rotation of the second drum within the second tub,
  a second transceiver, and
  a second controller configured to control the second motor; and
wherein the first transceiver and the second transceiver are configured to exchange washing-related data with each other,
wherein the first controller is configured to control the first washing unit to perform a first washing effect, the first washing effect including an operation-on period during which the first motor is operated and an operation-off period during which the first motor is on standby; and
wherein the second controller is configured to control the second washing unit to perform a second washing effect, the second washing effect including an operation-on period during which the second motor is operated and an operation-off period during which the second motor is on standby,
wherein the first washing effect and the second washing effect are performed simultaneously, and
wherein the operation-on period of the first washing unit is controlled not to overlap with the operation-on period of the second washing unit,
wherein the exchanged washing-related data comprises at least one of (i) data related to setting of a washing course or (ii) data related to an operation of the first and second motors.

19. The twin laundry machine according to claim 18, further comprising an integral cabinet that houses both the first washing unit and the second washing unit.

* * * * *